US008447688B1

(12) United States Patent
Thomas et al.

(10) Patent No.: US 8,447,688 B1
(45) Date of Patent: May 21, 2013

(54) RISK-BASED REFERENCE POOL CAPITAL REDUCING SYSTEMS AND METHODS

(75) Inventors: Paul A. Thomas, Ashburn, VA (US); Robert J. Fishman, Olney, MD (US); Clifford V. Rossi, Westlake Village, CA (US); Martin M. Loketek, Reston, VA (US)

(73) Assignee: Freddie Mac, McLean, VA (US)

( * ) Notice: Subject to any disclaimer, the term of this patent is extended or adjusted under 35 U.S.C. 154(b) by 41 days.

(21) Appl. No.: 13/174,302

(22) Filed: Jun. 30, 2011

Related U.S. Application Data

(60) Continuation of application No. 12/875,657, filed on Sep. 3, 2010, now Pat. No. 7,987,137, which is a division of application No. 10/813,260, filed on Mar. 31, 2004, now Pat. No. 7,792,742, application No. 13/174,302, filed on Jun. 30, 2011, which is a continuation-in-part of application No. 10/096,584, filed on Mar. 14, 2002, now Pat. No. 7,099,843, which is a continuation-in-part of application No. 09/602,254, filed on Jun. 23, 2000, now Pat. No. 7,028,007.

(60) Provisional application No. 60/151,071, filed on Aug. 27, 1999.

(51) Int. Cl.
*G06Q 40/00* (2012.01)
(52) U.S. Cl.
USPC ............................................. 705/38; 705/35

(58) Field of Classification Search
USPC .......................................................... 705/38
See application file for complete search history.

(56) References Cited

U.S. PATENT DOCUMENTS 5,966,700 A * 10/1999 Gould et al. .................... 705/38
7,099,843 B1 * 8/2006 Cassidy et al. ................. 705/38

OTHER PUBLICATIONS

Ghani, "Plan for Bank-Capital Rules Spurs Doubts," Jun. 7, 1999, Asian Wall Street Journal, p. 2.*
Seiberg, "Risk-Indexed Capital Rules Proposed by Global Panel," American Banker, vol. 164, Issue 106, p. 1.*

* cited by examiner

*Primary Examiner* — Samica L Norman
(74) *Attorney, Agent, or Firm* — Finnegan, Henderson, Farabow, Garrett & Dunner, LLP

(57) ABSTRACT

Embodiments consistent with the present invention provide a credit enhancement structure for risk allocation between parties that minimizes the regulatory capital reserve requirement impact to an institution subject to capital reserve requirement. A subject pool of assets held by the institution, such as a pool of loans, is rated to determine its risk levels. Based on the rated risk levels, a guarantor party agrees to be responsible for a portion of the risk associated with the pool of assets, which may define the maximum risk exposure of the institution holding the asset pool. The risk-rated capital reserve requirements are applied to the asset pool based on the risk level rating and the guarantor's agreed upon risk responsibility such that the institution holds a reduced amount of reserve capital compared to what it would otherwise be required to hold.

20 Claims, 16 Drawing Sheets

ACTUAL LIQUIDATION PROCEEDS + MAKE-WHOLE PAYMENT = 100%

Risk-Based Ratio Capital Reserve Requirements — 900

| Regulatory Rating Category 910 | Amount of Assets 920 | Risk-Based Ratio 930 | Base Capital Charge 940 | Cap. Reserve Requirement 945 |
|---|---|---|---|---|
| CASH Equiv. | $100 | 0% | 8% | $0 |
| AAA/AA/MBS | $100 | 20% | 8% | $1.60 |
| A-BBB | $100 | 50% | 8% | $4.00 |
| OTHER | $100 | 100% | 8% | $8.00 |
|  | $400 |  | Total: | $13.60 |

Flat Ratio Capital Reserve Requirements — 901

| Regulatory Rating Category 911 | Amount of Assets 921 | Flat Ratio 931 | Capital Reserve Requirement 946 |
|---|---|---|---|
| CASH Equiv. | $100 | 6% | $6.00 |
| AAA/AA/MBS | $100 | 6% | $6.00 |
| A-BBB | $100 | 6% | $6.00 |
| OTHER | $100 | 6% | $6.00 |
|  | $400 |  | $24.00 |

FIG. 9

| 1412 | Rated Positions | | | | | | | Capital | |
|---|---|---|---|---|---|---|---|---|---|
| | Subject Pool 1420 A | | Reference Pool 1430 B | | Subject & Reference Pool Delta 1440 A-B | | Capital Charge 1445 | Bank Risk-Based Capital 1450 | |
| | Levels (bps) 1415 | Size (bps) | Levels (bps) 1425 | Size (bps) | 1435 | Levels (bps) | (%) | (bps) | |
| UR | 0 | 23 | 0 | 15 | UR | 8 | 100 | 8.0 | |
| B | 23 | 23 | 15 | 15 | B | 8 | 100 | 8.0 | |
| BB | 46 | 24 | 30 | 15 | BB | 9 | 16 | 1.4 | |
| BBB | 70 | 51 | 45 | 33 | BBB | 18 | 8 | 1.4 | |
| A | 121 | 72 | 78 | 47 | A | 25 | 4 | 1.0 | |
| AA | 193 | 170 | 125 | 114 | AA | 56 | 1.6 | 0.9 | |
| AAA | 363 | 9637 | 239 | 9761 | AAA | NA | | | |
| | | 10,000 | | 10,000 | Total | 124 | | 20.8 | 1460 |

FIG. 14

RISK-BASED REFERENCE POOL CAPITAL REDUCING SYSTEMS AND METHODS

RELATED APPLICATION DATA

This is a continuation of application Ser. No. 12/875,657, filed Sep. 3, 2010 now U.S. Pat. No. 7,987,137, which is a divisional of application Ser. No. 10/813,260, as originally filed on Mar. 31, 2004 now U.S. Pat. No. 7,792,742, all of which are incorporated herein by reference.

This application is a continuation-in-part (CIP) of application Ser. No. 10/096,584, filed Mar. 14, 2002 now U.S. Pat. No. 7,099,843, which is a CIP of application Ser. No. 09/602,254, filed Jun. 23, 2000 now U.S. Pat. No. 7,028,007, which is related to and claims priority of Provisional Application No. 60/151,071, filed Aug. 27, 1999, in the names of Steven W. Abrahams and Henry J. Cassidy, and entitled Guarantee Certificates.

BACKGROUND OF THE INVENTION

A. Field of the Invention

The present invention generally relates to financial instruments, and systems and methods for issuing and administering the same. More particularly, the invention relates to systems and methods for separating certain payment rights associated with a pool of assets (which may or may not be securitized) from the remaining payment rights associated with the pool, such that the separated payment obligations form separately transferable financial instruments; Guarantee Certificates evidence an obligation of a mortgage insurer or a securities guarantor to make payments triggered by certain events, typically, default-related events involving a corresponding (in the case of a mortgage insurer) or an underlying (in the case of a securities guarantor) mortgage loan or loans.

The present invention also relates to systems and methods for hedging risk of loss on financial investments. The financial investments may include a pool of assets (which may or may not be securitized).

This invention also relates to risk-allocation structures for a pool of assets, and more particularly to risk-sharing structures for reducing the capital reserve requirement of at least one of the parties having an interest in the pool.

B. Description of the Related Art

Mortgage insurers regularly write contracts that cover the actual or estimated losses associated with the delinquency and default of mortgage loans. In the absence of mortgage insurance, when a mortgage loan becomes delinquent, the holder of the note typically loses interest payments it would otherwise have received and also may incur expenses associated with foreclosure and liquidation of the mortgaged property. The proceeds from liquidation also may fall short of the amount of principal due to the note holder. If, in lieu of a foreclosure, the mortgage loan is renegotiated in connection with the default, the note holder also may experience losses associated with the workout of the loan. In any case, mortgage insurance would reimburse the note holder for all or part of the foregone interest, expenses and liquidation shortfall.

In the case of loans that have been securitized, i.e., turned into a security, mortgage-backed security investors may turn to bond insurers or government-sponsored enterprises to mitigate losses arising from default of the underlying mortgage loans. These parties typically guarantee the timely payment of loan principal, interest or both. In exchange for a fee, these guarantors absorb all or a portion of the losses that would otherwise be associated with the guaranteed securities. When a securitized mortgage loan experiences a payment default, the guarantor typically compensates the security holder for the difference between scheduled principal and interest payments and the aggregate net amount which is actually realized from a workout or liquidation. As is the case with payments from mortgage insurers, this "make-whole" payment is passed along to a security holder undistinguished from the payment of interest and return of loan principal through normal means, such as amortization or prepayment.

In addition, the guarantor generally ensures that these payments are made to the securities investor at the originally scheduled time, so that the investor does not bear the risk or expense of delays inherent in the loan workout or foreclosure/liquidation process. The existence of insurance for a mortgage loan, or of a guarantee for a mortgage-backed security, is generally established at the beginning of the life of the loan or security in question. A contract between the insurer/guarantor and the investor or trustee sets the terms of the arrangement. A feature of this contract is that the payment obligation of the insurer or guarantor always runs to the owner of the insured or guaranteed asset so that the asset and the insurance cannot be decoupled, even if the value of the arrangement to the owner changes. This feature makes the arrangement illiquid and potentially less valuable.

Investors who purchase pools of mortgage loans typically collect a great deal of information about the loans in order to assess the risk associated with the investment. For example, an investor might want to know the borrower's income, credit score and other financial obligations, as well as the assessed value of the property and the loan to value ratio. Based on this information, the investor can statistically evaluate the probability that the loans in the pool will default and thereby determine the price he or she is willing to pay for the pool of loans. However, if some or all of the desired information is unavailable, the pool is an undesirable investment. In particular, an investor may be reluctant to purchase such a pool or may be willing only to pay a low price for it. And although an investor may attempt to hedge the risk of loss on such a pool, available hedging techniques do not accurately reflect the probability that the loans in the pool will default.

Insurance and hedges are generally available for the typical, well-understood risks associated with common assets and investments. For example, the common stock of a company has associated market risk, i.e., the risk that the stock price will drop due to an overall drop in the stock market, independent of the actions of the company or its prospects. One way an investor in common stock can hedge against market risk is by acquiring positions in a market-index-based security that will increase in value if the market index drops in value, such as puts (i.e., a short sale) on a SPYDER (a security that is designed to perform in the same way as the Standard & Poor's 500 index).

Risks that are unknown, new, or uncommon are difficult to hedge against because they are not understood well enough for the market to offer hedging products at a reasonable price. For example, lenders, such as banks, typically originate loans according to industry guidelines, which are often set out by the entities that subsequently take an interest in the loans from the originators, such as a subsequent purchaser, insurer, guarantor, or securitizer. Freddie Mac, Fannie Mae, and mortgage insurance companies are examples of such entities in the case of home mortgage loans. For any given class of loan, the guidelines typically specify, among other things, the minimum borrower credit ratings and Fair, Isaac and Company (FICO) scores, borrower income, borrower assets, the amount and type of documentation required to verify the information supplied by the borrower, the type of collateral required, the minimum loan to value ratio, etc. If a lender originates a loan using a process or parameters that vary from the guidelines, then an entity that normally would take an interest in the loan, such as a loan guarantor, may balk at doing so because it is uncomfortable with, does not understand, and does not know how to price the unknown risk associated with the lender's variance from the guidelines.

Accordingly, unknown, new, uncommon, or not-well-understood risks associated with an asset pose a problem if not separated or isolated such that the remaining well-understood risk can be insured, guaranteed, or hedged against in the marketplace. One solution, a reference pool structure, as described in U.S. patent application Ser. No. 10/096,584, is effective in isolating and limiting such unknown risks for a group of assets. A reference pool solution, however, may result in disadvantageous capital reserve requirements for capital regulated institutions, such as banks, bank holding companies, thrifts and other lenders and depositories that are subject to regulation by state and federal regulatory agencies, such as the Office of the Comptroller of the Currency (OCC), the Office of Thrift Supervision (OTS), and the Federal Deposit Insurance. Corporation (FDIC).

Regulated banks are required by federal and state regulations to hold a specified amount of capital in reserve ("reserve capital") against the total assets they have on their balance sheet. Typically, the reserve capital is simply the mathematical difference between the institution's assets and its liabilities. In the past under previous regulations, the capital reserve requirement for the total assets held by a bank was simple to calculate. The regulations called for a flat ratio of reserve capital to balance sheet assets, calculated by multiplying the value of all assets held by a bank by a fixed percentage. For example, if a bank held $500 in assets, the old regulations required the bank holding these assets to have $500×6%=$30 as reserve capital against the assets. Under the flat ratio capital reserve requirements, the identity or characteristics of the balance sheet assets did not matter. Thus, regardless of whether the assets were $500 of almost risk-free U.S. Treasury bonds or $500 of risky commercial loans, the capital reserve requirement was the same $30.

Over time, the capital reserve requirements evolved from a flat ratio to ratios based on asset type. Under the asset-type capital reserve requirements, each specified type of asset held by a capital-regulated institution had a specific capital reserve requirement associated with it. For example, if a bank held a mortgage loan in its portfolio, the asset-type capital reserve requirements required it to hold 4% reserve capital against loan-type assets, which meant that it could not fund more than 96% of the loan with debt. The regulators required the bank to have 4% reserve capital set aside to absorb losses on the loan that might occur. Thus, if the bank held a $100,000 mortgage on its books, it was required to have at least $4,000 of reserve capital to back up the loan.

While the asset-type capital reserve requirement is more reflective of risk than the flat ratio capital reserve requirement, it still has inequities. For example, under the asset-type capital reserve requirement, a bank holding $500 in high-quality commercial loans, which have a low risk of losing value, has the same capital reserve requirement as a bank holding $500 in low-quality commercial loans that have a significantly higher risk of default. By not fully considering the risk involved, the asset-type capital reserve requirements fail to fully reflect market conditions associated with the assets.

Some regulatory agencies are now moving to risk-based ratio capital reserve requirements, which are a more ratings-based, risk-weighted approach for determining the capital reserve requirements for a capital-regulated institution. The regulatory agencies are recognizing that credit risk ratings, as conventionally used in the public bond markets, for example, are useful for fairly determining capital reserve requirements for certain bank-held assets, such as rated bonds. For example, a AAA-rated bond is less risky than a BB-rated bond. Regulatory agencies have begun to tier capital reserve requirements based on a risk-weighted approach such that, for example, banks are required to hold less reserve capital for low risk rated securities than for high risk rated securities. Thus, some regulatory agencies recognize that AAA-rated corporate bonds held by a bank are less risky, and therefore require less reserve capital to cover losses, than BB-rated corporate bonds.

FIG. 9 illustrates two examples of different types of capital reserve requirements. Table 900 illustrates an example of risk-based capital reserve requirements. As shown, the Regulatory Rating Category column 910 specifies four exemplary asset rating categories: a Cash Equivalents category in row 950 (which includes U.S. Treasury bonds), a AAA/AA/MBS category in row 960 (which includes AAA- to AA-rated securities and mortgage-backed securities issued by government-sponsored enterprises (GSEs) such as Freddie Mac and Fannie Mae), an A to BBB category in row 970 (which includes A- to BBB-rated securities), and an "Other" category in row 980 (which includes everything else). The ratings categories are a measure of the risk associated with the assets identified as belonging to each category. The rating categories are exemplary, and more, fewer, or different categories may be used by various regulators. In addition, risk measurements other than those provided by ratings agencies are also consistent with the principles of the invention.

As shown, the Amount of Assets column 920 contains an exemplary dollar value of assets held by a capital-regulated institution. In this example, the institution has $100 in U.S. Treasury bonds and cash (column 920, row 950), which regulatory agencies consider a Cash Equivalent category asset; $100 worth of AAA-rated bonds, AA-rated bonds, and Freddie Mac or Fannie Mae mortgage-backed securities (column 920, row 960), which regulators consider AAA/AA/MBS category assets; $100 worth of A- to BBB-rated securities (column 920, row 970), which are considered A to BBB category assets; and $100 in commercial loans (column 920, row 980), which are considered to fall into the "Other" category. The "Other" category also may include assets such as consumer loans, junk bonds, office buildings, fixed assets, etc., that do not fall into any of the preceding categories. Thus in the example shown by table 900, the capital-regulated institution holds $400 in total assets (995).

The Risk-Based Ratio column 930 contains a multiplication factor for each rating category 910. This factor weights the capital reserve requirement according to the risk associated with the assets in each category. The lower the risk, the less the required reserve capital. The higher the risk, the higher the required reserve capital. For example, as shown in table 900, assets rated in the Cash Equivalents category 950 require no capital reserve (0%), because such assets are essentially risk free. A- to BBB-rated bonds 970, on the other hand, are subject to a 50% risk-based ratio 930. The risk-based ratio 930 for each rating category 910 is typically set by regulatory agencies, and may change or be different from the exemplary ratios shown in FIG. 9.

The next column in table 900 is the Base Capital Charge column 940. In the example shown, the base capital charge is 8% for each rating category 910. The base capital charge 940 for each rating category 910 is typically set by government regulators, and may change or be different from the exemplary charges shown in FIG. 9. For example, in general, regulatory agencies apply an 8% base capital charge to "Other" assets. There are, however, some assets in that category (e.g., very risky investments) that could require dollar-for-dollar reserve capital; i.e., a 100% base capital charge because of the large risk of losses associated with such assets.

Column 945 shows the Capital Reserve Requirements for a capital-regulated institution holding the assets shown in column 920. The capital reserve requirements 945 for each of the assets 920 in each of the rating categories 910 is obtained by multiplying the amount of assets 920 by the risk-based ratio 930 and the base capital charge 940. For example, the $100 worth of AAA/AA/MBS category assets (row 960, column 920) is multiplied by the 20% risk-based ratio (row 960, column 930) and the 8% base capital charge (row 960, column 940) to yield a capital reserve requirement of $1.60 for these assets (row 960, column 945). The total reserve capital required for the $400 worth of total assets 995 is the sum of the capital reserve requirements for each category 910, which is $13.60 (998) in this example.

Table 901 illustrates the reserve capital required for the same assets under the old flat ratio capital reserve requirements. A capital-regulated institution with the assets shown in column 921 of table 901 would be required to hold $400 (996)×6% (column 931)=$24 (999) as reserve capital against such assets. As illustrated by table 900, under the risk-based ratio capital reserve requirements, the reserve capital requirement is $13.60. Thus, in this example, the risk-based ratio capital reserve requirements reduce the reserve capital required by 43% over the flat ratio capital reserve requirements, reflecting the low-risk nature of part of the total assets.

Conventionally, the risk-based ratio capital reserve requirements apply to securitized assets or securities rated by a ratings agency, such as corporate bonds rated by Standard & Poor's. Thus, for a capital-regulated institution holding assets other than rated securities, the assets fall into the "Other" category 980 and the institution is required to hold the maximum amount of reserve capital against the assets, regardless of their qualities or characteristics. For example, if a bank held $400 in unsecuritized commercial loans, then under the risk-based ratio capital reserve requirements illustrated by table 900, the bank would be required to hold $32 in reserve capital against the commercial loans, even if they were as risk-free as cash. This same situation holds true for any asset that falls into a category representing more risk than the rated risk associated with the asset.

For capital-regulated institutions, it is desirable to minimize the level of reserve capital that must be held under the capital reserve requirements.

SUMMARY OF THE INVENTION

The present invention includes the use of a financial instrument (referred to herein as a "Guarantee Certificate") that takes the payment obligations of the mortgage insurers and securities guarantors and places them into a separate, transferable financial instrument. Guarantee Certificates of the present invention pay an investor(s) based on specified triggering events associated with a loan pool. Triggering events can be defined by loan delinquency, foreclosure on a property backing an insured or guaranteed mortgage, acquisition of a deed in lieu of foreclosure of the collateral, or liquidation of a property formerly backing an insured or guaranteed mortgage. The Guarantee Certificate may offer payment based on a fixed percentage of the defaulted loan principal, payment of actual or estimated losses, or a formula that combines these or other elements or a multiple of the same. The loan pool for a given Guarantee Certificate could include one or more loans of any type or origin.

Issuers can create Guarantee Certificates either by restructuring the cash flows from existing insurance or guarantee arrangements, or by issuing the securities de novo. In a restructuring, the issuer pools loans or securities already insured or guaranteed and places them in a trust. The trustee identifies and segregates the cash flows paid to satisfy insurance or guarantee claims, and the trust issues Guarantee Certificates entitled to receive a specified schedule of the insurance or guarantee payments. The payments can be a straight dollar-for-dollar pass-through of the insurance or guaranty payments, or can be determined by a formula based on the payments. In a de novo issuance, the issuer specifies a set of loans (which may or may not be securitized) as a Reference Pool and issues Guarantee Certificates entitled to receive formula-based cash flows triggered by specified events or conditions in the Reference Pool. The Reference pool may be static or dynamic.

In another embodiment of the present invention, systems and methods are disclosed for using Reference Pools as credit enhancements for hedging risk of loss on loan investments. Such systems and methods use criteria established by the parties for hedging risk of loss on the purchase and sale of loan investments. Such systems and methods may monitor the performance of a Reference Pool and a Subject Pool of loans. The Subject Pool of loans may include loans that are the subject of the investment transaction. The Reference Pool may include loans having similar characteristics to loans in the Subject Pool. Further, such systems and methods may compare the monitored performances of loans in the Reference Pool and the Subject Pool. At the end of a payment cycle, such as the end of a fiscal year, such systems and methods may calculate a payment due to the buyer or seller based on the comparison of the monitored performances of loans in the Reference Pool and the Subject Pool, and an established payment formula. Thereafter, such systems and methods may generate an invoice or a payment form, such as a check payable to one of the parties based on the calculated payment due. The effect of such systems and methods is to hedge against the loss resulting from the difference in performance between the loans in the Reference Pool and the Subject Pool. In addition, such systems and methods may generate and/or adjust the composition of the Reference Pool of loans based on comparable attributes of the Subject Pool of loans.

Embodiments consistent with the present invention provide a credit enhancement structure for risk sharing between parties that minimizes the regulatory capital reserve requirement impact to one or more parties. One embodiment of a structure consistent with the invention includes two loan pools. The first pool is the subject pool, which contains the loans for which the parties will share risk. The second pool is a reference pool that contains loans mimicking or sharing most of the features of the loans in the first pool, except for one or more features that create an unknown risk, for example, a reduced level of borrower documentation. A ratings agency, such as Standard & Poor's and Moody's, rates the two pools separately and establishes loss coverage levels for each of the pools. One party takes all the risk for the subject pool up to the loss coverage level established for the reference pool, and a second party takes all or part of the risk above the loss coverage level. The second party's risk may be capped at some maximum. Because the second party's risks are limited by the loss coverage levels and cap, the capital reserve requirements for that party are reduced compared to holding the subject pool assets without the credit enhancement structure.

Other embodiments consistent with the present invention include systems, computer program products and methods for reducing capital required to be held in connection with a subject pool of loans comprising the operations of: obtaining a credit risk rating of the loans in the subject pool, allocating credit risk for the subject pool, based on the credit risk rating, applying capital reserve requirements to the subject pool based on the credit risk rating and the allocated credit risk; and holding an amount of capital against the subject pool based on application of the capital reserve requirements.

Other embodiments consistent with the present invention include systems, computer program products and methods for reducing capital required to be held in connection with a subject pool of assets including the operation of: obtaining a risk rating of the assets in the subject pool, guaranteeing a portion of risk for the subject pool, based on the risk rating, facilitating application of capital reserve requirements to the subject pool based on the risk rating and an unguaranteed portion of risk to determine an amount of capital held in connection with the subject pool, monitoring performance of the subject pool to determine any guarantee obligations, and conveying funds based on any determined guarantee obligations and the monitored performance.

Other embodiments include systems and methods for reducing capital required for a subject pool of assets comprising obtaining a risk rating of the assets in the subject pool; retaining a portion of risk for the subject pool, based on the risk rating; applying capital reserve requirements to the subject pool based on the risk rating and the retained portion of risk; and adjusting an amount of capital held against the subject pool based on application of the capital reserve requirements.

Still other embodiments include systems and methods for A method for reducing capital required to be held in connection with a subject pool of assets comprising: obtaining a risk rating of the assets in the subject pool. obtaining a risk rating of assets in the subject pool, retaining a portion of risk for the subject pool, based on the difference between the risk rating of the assets in the subject pool and the assets in the reference pool, applying capital reserve requirements to the subject pool based on the retained portion of risk, determining an amount of capital to hold in reserve in connection with the subject pool based on application of the capital reserve requirements; and presenting the determined amount of capital.

Yet other embodiments include systems and methods for reducing capital required to be held in connection with a subject pool of assets comprising: obtaining a risk rating of the assets in the subject pool, obtaining a risk rating of assets in the subject pool, obtaining a risk rating of a delta between the risk rating of the assets in the subject pool and the assets in the reference pool, retaining a portion of risk for the subject pool, based on the risk rating of the delta, applying capital reserve requirements to the subject pool based on the retained portion of risk, determining an amount of capital to hold in reserve in connection with the subject pool based on application of the capital reserve requirements, and presenting the determined amount of capital.

BRIEF DESCRIPTION OF THE DRAWINGS

The accompanying drawings, which are incorporated in and constitute a part of this specification, illustrate the various features and aspects of the invention and, together with the description, explain the advantages and principles of the invention. In the drawings.

FIG. 9 illustrates two examples of different types of capital reserve requirements;

FIG. 14 is a table illustrating an exemplary risk-sharing arrangement based on asset ratings and the resultant capital reserve requirements, consistent with the invention;

DETAILED DESCRIPTION

Figure 1:
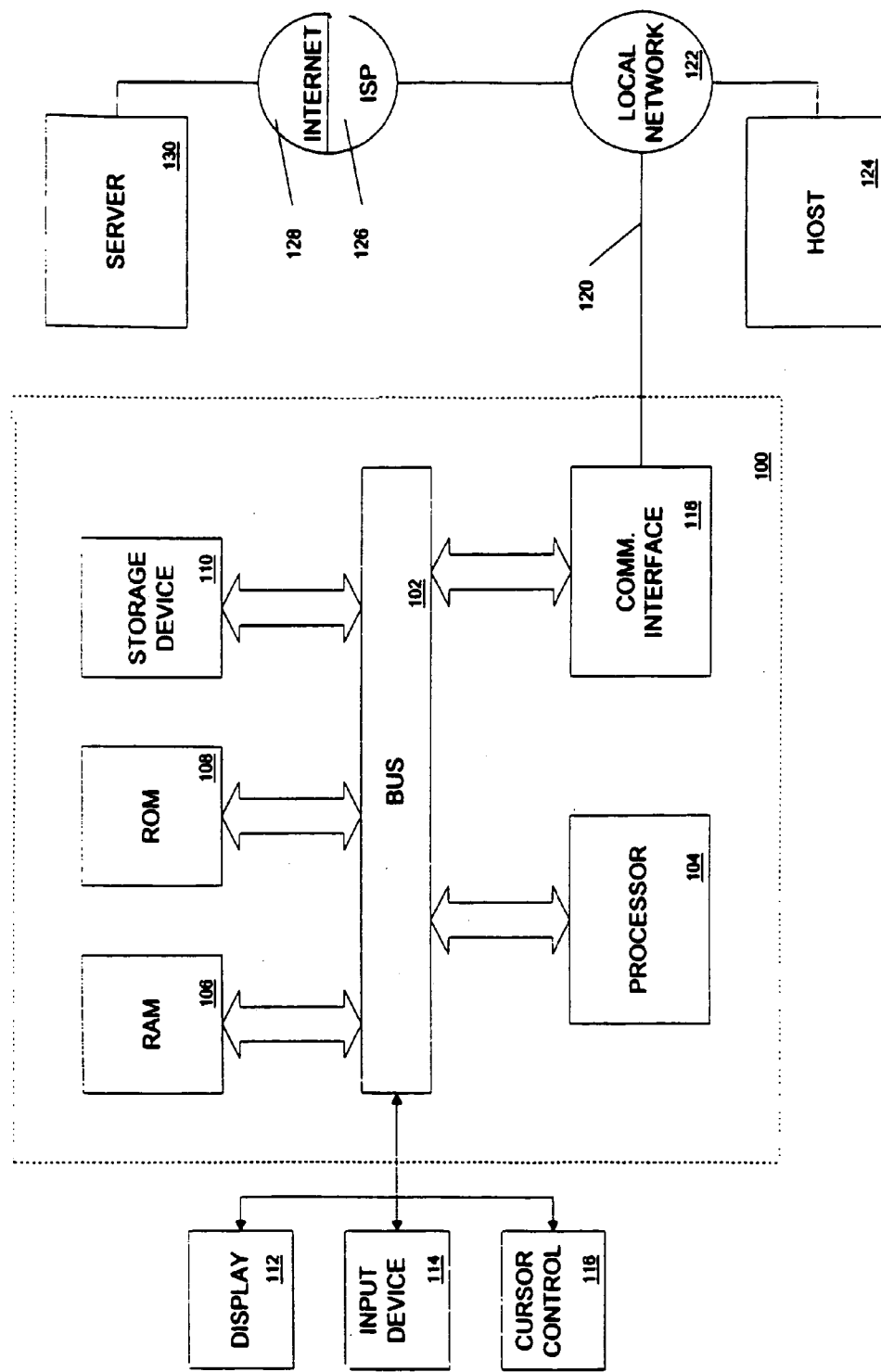
FIG. 1 is a schematic block diagram of a data processing system architecture suitable for use with the present invention.

Reference will now be made in detail to an implementation of the present invention as illustrated in the accompanying drawings. Wherever possible, the same reference numbers will be used throughout the drawings and the following description to refer to the same or like parts.

Overview

Systems and methods consistent with the present invention process information corresponding to Guarantee Certificates, which are financial instruments that evidence the obligation of an insurer or a guarantor to make payments that are triggered by certain events. The triggering event creates the payment obligation.

In one embodiment, a Guarantee Certificate evidences the obligation of a mortgage insurer or a securities guarantor to make payments that are triggered by events, typically, default-related events, involving a related (in the case of a mortgage insurer) or an underlying (in the case of a securities guarantor) mortgage loan or loans. For example, the instrument might evidence the obligation of a mortgage insurer or securities guarantor to make payments to the Guarantee Certificate holder based on the payment default of a borrower or borrowers with respect to the group (the "Reference Pool") of related or underlying mortgage loans (the "Reference Loans" or "Reference Pool elements") associated with the Guarantee Certificate.

A data processing system tracks the status of the Reference Loans (elements) in a series of Reference Pools uniquely associated with each Guarantee Certificate. When the data processing system identifies a default under a Reference Loan or another payment-triggering event, it calculates the amount payable to the appropriate Guarantee Certificate holder.

A unique feature of Guarantee Certificates is that they are decoupled from, and therefore, in one preferred embodiment, may be bought, sold, and conveyed independently of the Reference Loans and/or mortgage-backed securities representing an interest in the Reference Loans that are the source of the payment-triggering events. In other words, Guarantee Certificates can be made tradable, if the issuer so desires.

In another embodiment, a Reference Pool of loans may be used as a credit enhancement for hedging (sharing) risk of loss on loan investments. For example, a seller may wish to sell a pool of loans to a buyer, but the buyer may be reluctant to purchase such loans because of a lack of information to determine a default risk factor for such loans. In order to overcome this uncertainty, the buyer and seller may enter into a risk-sharing arrangement in connection with the transaction. For convenience, the pool of loans is referred to as a Subject Pool. In such an arrangement, a Reference Pool may be created with loans having attributes that are comparable to attributes of loans in the Subject Pool.

The arrangement may stipulate a payment formula and one or more payment cycles. At the end of each payment cycle, a payment may be made to one party by the other party based on the payment formula and the performance of the loans in the Subject Pool and the Reference Pool. For example, at the end of a payment cycle, the data processing system may use the payment formula to determine the cumulative dollar losses on loans in the Subject Pool and the Reference Pool. If cumulative losses on loans in the Reference Pool exceed those of loans in the Subject Pool, the buyer may pay the seller the amount that the Reference Pool losses exceed the Subject Pool losses. However, if cumulative losses on loans in the Subject Pool exceed those of loans in the Reference Pool, the seller may pay the buyer the amount that the Subject Pool losses exceed the Reference Pool losses.

Adjustments may be made to the Reference Pool when a change occurs to the composition of the Reference Pool or the Subject Pool. For example, adjustments may be made to the Reference Pool when a change occurs to the number of loans or the size (i.e., unpaid principal balance ("UPB")) of the Subject Pool or the Reference Pool due to, for example, prepayment of loans. The adjustments may include adding or deleting loans to/from the Reference Pool to maintain the relative number of loans in the two pools or the relative total dollar amount of the UPB in the two pools. Alternatively, the payment formula may include adjustments to take into account the change in the number of loans or the total dollar amount of the UPB of the Subject Pool or the Reference Pool due to, for example, prepayment of loans. Such adjustments may be made to ensure comparability of the two pools of loans.

Reference will now be made in detail to exemplary embodiments of systems and methods consistent with the present invention, which are also illustrated in the accompanying drawings. Those of ordinary skill in the relevant art will recognize from the description that other embodiments are possible, and changes may be made to the implementations described herein without departing from the spirit and scope of the invention.

Data Processing System Architecture

The present invention may be implemented by computers or workstations organized in a distributed processing system architecture, with any suitable combination of software, hardware, and/or firmware.

FIG. 1 is a block diagram that illustrates a data processing system 100 in which methods and systems consistent with the present invention may be implemented. System 100 includes a bus 102 or other communication mechanism for communicating information, and a processor 104 coupled with bus 102 for processing information. System 100 also includes a main memory, such as a random access memory (RAM) 106 or other dynamic storage device, coupled to bus 102 for storing information and instructions to be executed by processor 104. RAM 106 also may be used for storing temporary variables or other intermediate information during execution of instructions by processor 104. System 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

System 100 may be coupled via bus 102 to a display 112, such as a cathode ray tube, for displaying information to a user. An input device 114, including alphanumeric and other keys, is coupled to bus 102 for communicating information and command selections to processor 104. Another type of user input device is a cursor control 116, such as a mouse, a trackball or cursor direction keys, for communicating direction information and command selections to processor 104 and for controlling cursor movement on display 112. This input device typically has two degrees of freedom in two axes, a first axis (e.g., x) and a second axis (e.g., y), that allow the device to specify positions in a plane.

The present invention is related to the use of system 100 for issuing and maintaining Guarantee Certificates. In addition, the present invention is related to the use of system 100 for utilizing reference pools as credit enhancements. These operations may involve accessing information from remote platforms and transmitting information to remote platforms. According to one implementation of the invention, information from remote platforms is provided to system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of radio frequency, acoustic or light waves, such as those generated during radio-wave and infra-red data communications.

Common forms of computer-readable media include, for example, a floppy disk, a flexible disk, a hard disk, a magnetic tape, any other magnetic medium, a CD-ROM, any other optical medium, a punch card, a paper tape, any other physical medium with patterns of holes, a RAM, a PROM, an EPROM, a FLASH-EPROM, any other memory chip or cartridge, a carrier wave as described hereinafter, or any other medium from which a computer processor can read.

Various forms of computer readable media may be involved in carrying one or more sequences of one or more instructions and/or data to processor 104. For example, instructions may initially be carried on the magnetic disk of a remote computer. The remote computer can load the instructions into its dynamic memory and send the instructions over a telephone line using a modem. A communication interface 118 local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

As shown, system 100 includes communication interface 118 coupled to bus 102. Communication interface 118 provides a two-way data communication coupling to a network link 120 that is connected to a local network 122. For example, communication interface 118 may be an integrated services digital network (ISDN) card, or a modem to provide a data communication connection to a corresponding type of cable or telephone line, or an infrared-transmitting modem directly connected to local network 120 and connected via an infrared detector to bus 102, as discussed above. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry analog or digital data streams representing various types of information.

Network link 120 typically provides data communication through one or more networks to other data devices. For example, network link 120 may provide a connection through local network 122 to a host computer 124 and/or to data equipment operated by an Internet Service Provider (ISP) 126. ISP 126 in turn provides data communication services through the Internet 128. Local network 122 and Internet 128 both use electric, electromagnetic or optical signals that carry digital data streams. The signals through the various networks and the signals on network link 120 and through communication interface 118, which carry the digital data to and from system 100, are exemplary forms of carrier waves transporting the information.

System 100 can send messages and receive data, including program code, through the network(s), network link 120 and communication interface 118. In the Internet example, a server 130 might transmit a requested code for an application program through Internet 128, ISP 126, local network 122, network link 120, and communication interface 118. In accordance with the present invention, one such downloaded application provides a bridge between two remote information sources, as described herein. The received code may be executed by processor 104 as it is received, and/or stored in storage device 110, or other non-volatile storage for later execution. In this manner, system 100 may obtain application code in the form of a carrier wave.

Although system 100 is shown in FIG. 1 as being connected to one server, 130, those skilled in the art will recognize that computer system 100 may establish connections to multiple servers on Internet 128. Each such server includes an Internet application such as an HTML- or XML-based application, which may provide information to computer system 100 upon request in a manner consistent with the present invention.

The system architecture just described is exemplary. One of ordinary skill in the art could easily substitute, replace, add, or eliminate various components without departing from the principles of the present invention. For example, the various networks and communication paths described could be implemented using DSL, cable, wireless, and/or Internet technology in place of the technology described.

Guarantee Certificates

In one embodiment, steps according to the present invention are embodied in machine-executable software instructions, and components of the present invention are carried out in a processing system by a processor executing the instructions. In other embodiments, hardwired circuitry may be used in place of, or in combination with, software instructions to implement the present invention.

Figure 2:
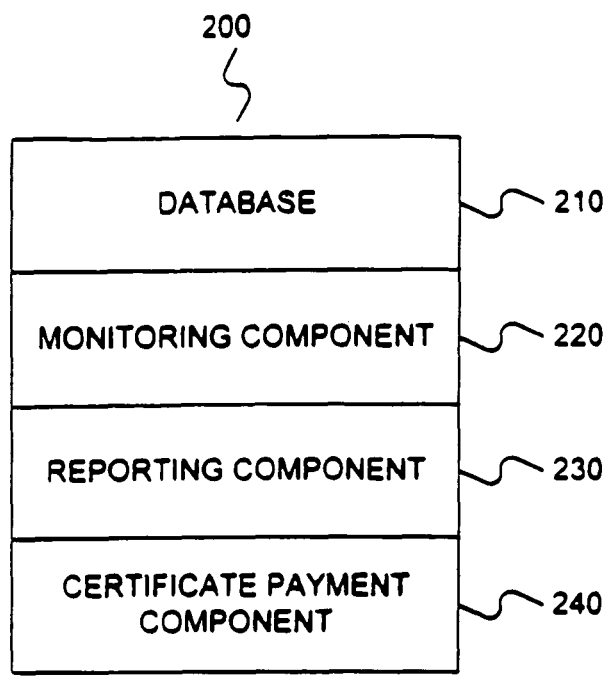
FIG. 2 is a block diagram of the components of a system for managing Guarantee Certificates.

In one embodiment, system 100 uses four software components to support Guarantee Certificates in a manner consistent with the present invention. As shown in FIG. 2, the components 200 include a database management system 210, a monitoring component 220, a reporting component 230, and a certificate payment component 240.

(1) Database Management System

Database management system ("database") 210 holds identifying information, including the initial attributes, of each loan or other element of the Reference Pool that is the source of the "guaranteed" risk, including the identity of the Reference Pool or Reference Pools to which each element belongs. For example, in the case of a Reference Pool of mortgages, database 210 holds information and attributes for mortgage loans in the pool. Database 210 also holds information on the ongoing status or performance of each element in the Reference Pool. In the case of mortgage risk, ongoing information could include coupon history, principal balance history, payment history, delinquency history, borrower's credit history, and any other information on a variable aspect of a given loan. Database 210 may also hold information concerning a Guarantee Certificate itself, such as the elements in the certificate's Reference Pool, the current holder or holders of the certificate, and the certificate's conveyance history. Database 210 has the ability to accept either manual or electronic input and to deliver either printed or electronic output.

Database 210 uses a query language (such as standard query language "SQL") to access stored information. The query language allows the user to extract data either using a keyboard or using another program without knowing the detailed structure of the database. For example, the user might be able to request, using a query language query, a payment history for all 30-year loans originated in 1993 without knowing precisely where this information is located in database 210. In addition, database 210 includes methods of checking for possible data input errors and/or data inconsistencies and for reporting and/or correcting those errors and inconsistencies.

(2) Monitoring Component

Figure 3:
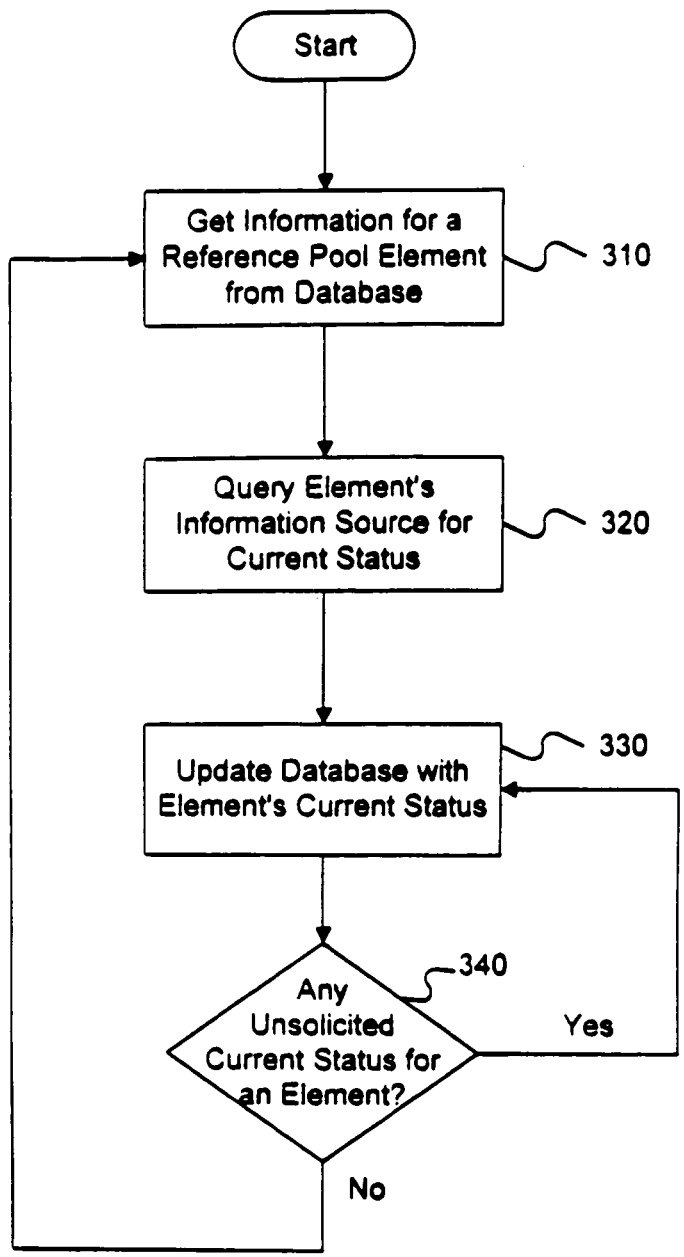
FIG. 3 is an exemplary flowchart of the steps performed by the monitoring component of a Guarantee Certificate system, consistent with the principles of the present invention.

A monitoring component 220 queries and takes input from agents that monitor the ongoing status or performance of each element in the Reference Pool, with particular emphasis on status changes that constitute triggering events for purposes of the payment function. FIG. 3 is an exemplary flowchart of the steps performed by a monitoring component of a Guarantee Certificate system, consistent with the principles of the present invention.

As shown in FIG. 3, the first step of the process gets information concerning a Reference Pool element from database 210 (step 310). The information includes the identity of a status information source for the element. The status information source is anything that can supply current status regarding the element, such as a person, a computer system such as host 124, or a database hosted on a computer system such as server 130. In the case of a Reference Pool of mortgages, the status information source is typically a mortgage servicer or other person who monitors loan status or performance.

Next, monitoring component 220 queries the Reference Pool element's information source for the current status of the element (step 320). In the case of a human information source, querying typically involves generating a written message requesting information, such as a letter or email message. In the case of an automated information source, querying typically involves an electronic service request sent across network 122, or an electronic query to a database.

When an element's current status information is received in response to the query, monitoring component 220 records the information in database 210 (step 330). For a non-electronic response, such as a letter from a person, recording the current status information in database 210 typically involves manually entering the information using input device 114. For an automated response, such as the electronic results of a query to a remote database, recording typically involves automatically saving the information in database 210.

In step 340, if current status information for a Reference Pool element arrives unsolicited (i.e., not in response to a monitoring component query), then monitoring component 220 updates database 210 with the current status (step 330). If there is no unsolicited current status information to process, then the monitoring component process returns to step 310 to process another Reference Pool element.

(3) Reporting Component

Reporting component 230 allows ad hoc or standard queries to database 210 and generates electronic or printed reports. In the case of a Reference Pool of mortgages, this component queries database 210 and reports on payment status, delinquent status or any other attribute either for individual loans or in the aggregate. Reporting component 230 also provides information about one or more Guarantee Certificates, including descriptive information and the history of certificate holder payments made.

(4) Certificate Payment Component

Figure 4:
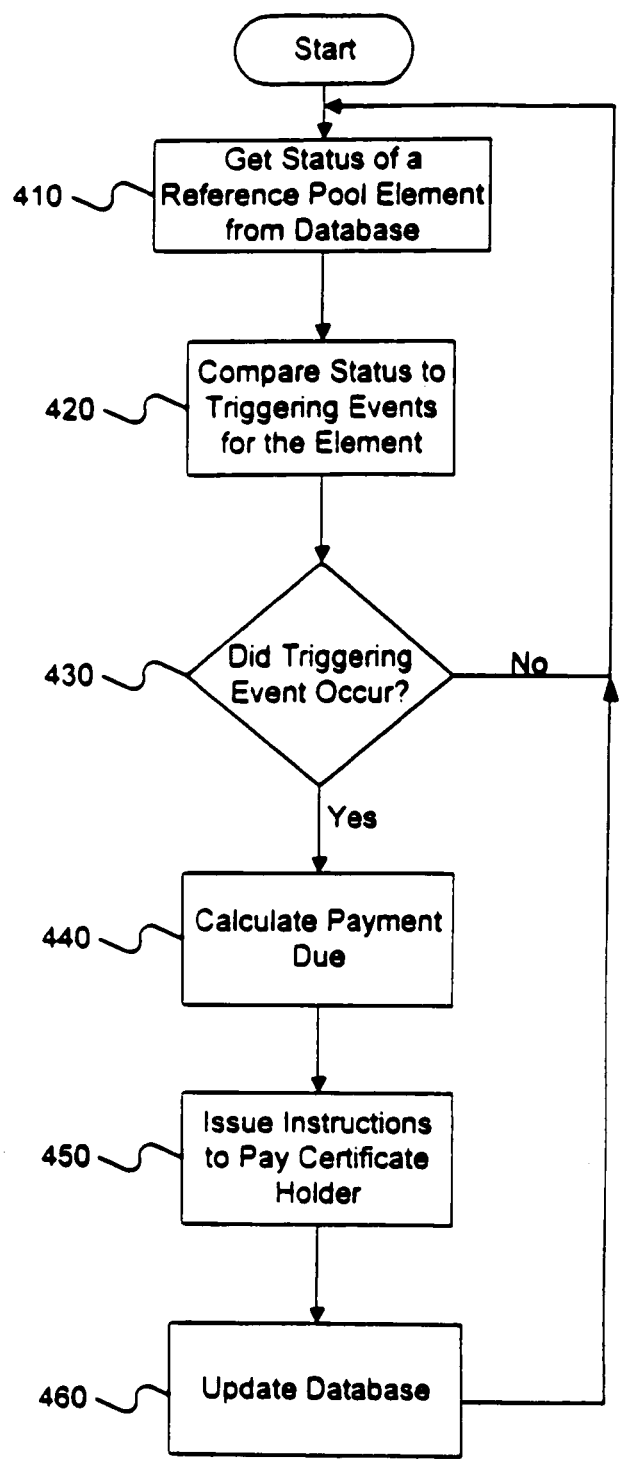
FIG. 4 is a flowchart of the steps performed by the certificate payment component of a Guarantee Certificate system, consistent with the principles of the present invention.

Certificate payment component 240 stores the definition of events that trigger payments to Guarantee Certificate holders, identifies when triggering events occur, calculates any payments due, and issues instructions to pay Certificate holders. FIG. 4 is an exemplary flowchart of the steps performed by the certificate payment component of a Guarantee Certificate system, consistent with the principles of the present invention.

As shown in FIG. 4, the first step of the process gets the status information of a Reference Pool element from database 210 (step 410). In the case of a Reference Pool of mortgages, payment component 240 keeps a list of the loans in database 210 belonging to the pool and gets the status information of each of them.

Next, payment component 240 compares the status information to the triggering event or events for the Reference Pool element (step 420). Payment component 240 keeps a definition of each triggering event for a Guarantee Certificate, such as reaching the status of a specified number of days delinquent, loan foreclosure, property liquidation or another event monitored or recorded by the system. If the triggering event did not occur (step 430; No), then payment component 240 returns to step 410 to process another Reference Pool element. If the triggering event occurred (step 430, Yes), then the process moves to step 440.

In step 440, payment component 240 calculates the payment due for the triggering event. The calculation can involve any mathematical formula related or unrelated to any variable measured by the system. For example, the payment can be a straight dollar-for-dollar pass-through of the insurance or guarantee payment, or a fixed percentage of the insurance or guarantee payment, or some other amount based on a formula. Next, payment component 240 issues instructions to pay the Certificate holder or holders (step 450). This typically involves sending an electronic or printed notice to the paying agent for the Guarantee Certificate in question.

Payment component 240 then updates database 210 regarding the payment made to the Guarantee Certificate holder (step 460), and returns to step 410 to process another Reference Pool element.

One of ordinary skill in the art will recognize that many modifications can be made to the components and steps described without departing from the principles of the present invention. For example, monitoring component 220 and reporting component 230 could be combined into a single component that performs the functions of both.

Issuing Process

Figure 5:
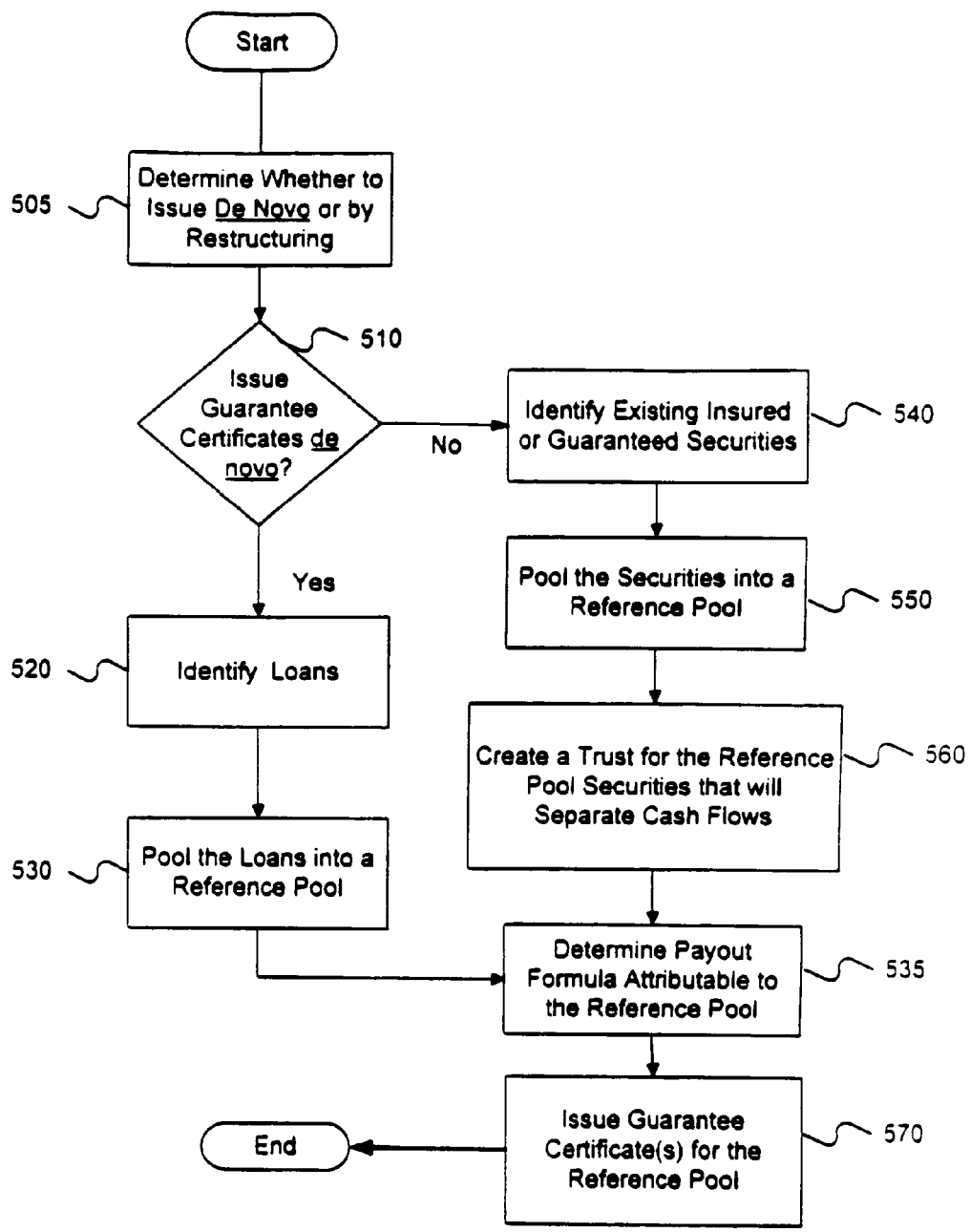
FIG. 5 is a flowchart of steps for issuing a Guarantee Certificate, consistent with the principles of the present invention.

Issuers can create Guarantee Certificates either by restructuring the cash flows from existing insurance or guarantee arrangements, or by issuing the certificates de novo. FIG. 5 is an exemplary flowchart of the steps for issuing a Guarantee Certificate, consistent with the principles of the present invention.

As shown in FIG. 5, the issuer first determines whether to issue a Guarantee Certificate de novo, or by restructuring existing financial obligations (step 505). If, at step 510, the issuer decides to issue de novo Guarantee Certificates, the issuer identifies or specifies a set of loans (which may or may not be securitized) (step 520), and pools the loans into a Reference Pool (step 530).

The issuer then determines a payout formula attributable to the Reference Pool (step 535). For de novo Guarantee Certificates, the Reference Pool merely acts as an index and no cash flows attributable to the loans in the Pool are used to satisfy the de novo Guarantee Certificate payout formula obligation.

In one preferred embodiment, the issuer determines the payout formula by analyzing the behavior of the Reference Pool relative to a separate loan pool. For example, a de novo issuer of Guarantee Certificates for a pool of manufactured-housing loans may model the manufactured-housing loan Reference Pool relative to the performance of a single-family-housing loan pool. Even if the issuer is not familiar with the performance of the manufactured-housing pool, by comparing it against the familiar single-family-housing pool, the issuer can determine a payout formula that reflects the differences between the two. For example, if the delinquency rate of manufactured-housing loans is twice that of single-family-housing loan, then the issuer could make the manufactured-housing loan pool Guarantee Certificate payout formula (on a per loan basis) one-half of the formula used for a single-family housing loan pool.

In step 570, the issuer issues Guarantee Certificate(s) entitled to receive cash flows specified by the payout formula and triggered by specified events or conditions in the Reference Pool.

If the issuer decides not to issue de novo Guarantee Certificates (step 510), then the issuer can restructure existing financial obligations to issue Guarantee Certificates. For a restructuring issue, the issuer identifies existing loans and/or securities already insured or guaranteed (step 540) and pools the loans and/or securities into a Reference Pool (step 550). In contrast to de novo issuance, the cash flows used to satisfy any Guarantee Certificate obligation come from the securities in the Reference Pool.

In forming the Reference Pool, the issuer may choose loans or securities based upon the perceived risk associated with each, the potential make-whole payment associated with each, or other factors. Pooling involves forming the loans and/or securities into an identified group. The Reference Pool may be static or dynamic. With static Reference Pools, the loans are identified when the Reference Pool is created and cannot be changed. With dynamic pools, loans can be added or removed according to a pre-specified eligibility rule. For example, an eligibility rule might be loans purchased by a specified entity having specific characteristics such as loan size or type. Dynamic pools can be used to hedge an active portfolio by reducing the need to continually adjust the hedge as new loans are added to the portfolio.

Next, the issuer creates a trust to hold the Reference Pool loans or securities (step 560). The trust obligates the trustee to identify and segregate the cash flows paid to satisfy insurance or guarantee claims from the cash flows normally paid by the underlying loans or securities. Guarantee Certificates are then issued based on the trust created by the issuer. Each Guarantee Certificate is entitled to receive a specified schedule of the insurance or guarantee payments (step 570). The payments can be a straight dollar-for-dollar pass-through of the insurance or guaranty payments, or can be determined by a formula based on the payments.

When a Guarantee Certificate is issued, the term (time period) of a Guarantee Certificate may vary from the terms of the loans in the Reference Pool. The Guarantee Certificate period may be longer or shorter than the terms of the pool elements. For example, the Reference Pool may contain 30-year mortgages exclusively, yet the issuer may issue a Guarantee Certificate with a term or 10 years or with a term of 40 years.

Figure 6:
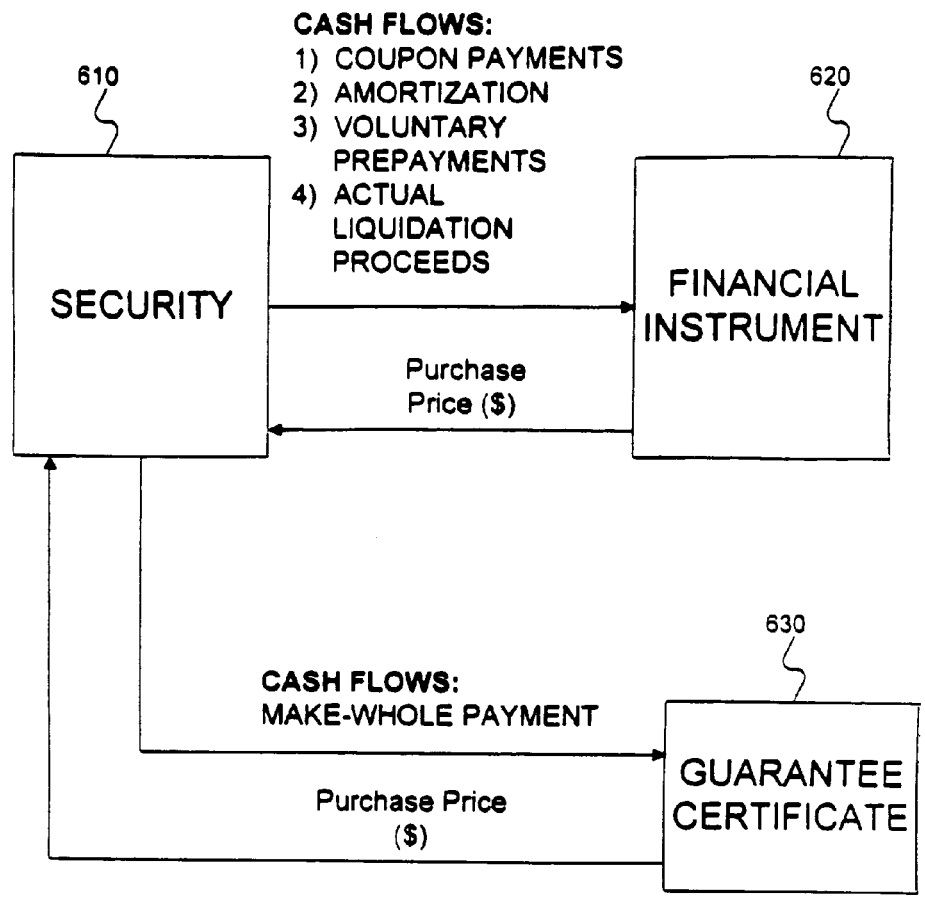
FIG. 6 is a block diagram illustrating the process of restructuring cash flows from existing guarantee arrangements to issue Guarantee Certificates, in accordance with the principles of the present invention.

FIG. 6 further illustrates one way in which cash flows from existing guarantee arrangements, such as insured loans, can be restructured to issue Guarantee Certificates in accordance with one aspect of the present invention. As shown in FIG. 6, security 610 represents a set of investments, for example, a Reference Pool of loans. Associated with security 610 is a traditional financial instrument 620 and a Guarantee Certificate 630. In exchange for the purchase price, the holder of financial instrument 620, which may be a bond or other instrument evidencing a guarantee obligation, receives all cash flows traditionally associated with the guarantee obligation. For example, in the case illustrated of a mortgage loan, the holder of financial instrument 620 receives payments in the forms of: all regular interest payments (shown as coupon payments), amortization benefits, voluntary prepayments, and the actual liquidation proceeds if the collateral underlying security 610 is sold. The holder of Guarantee Certificate 630, on the other hand, receives a cash flow in the form of a make-whole payment only if the collateral underlying security 610 is liquidated. A make-whole payment is the difference between the full value of security 610 and the actual liquidation proceeds. Thus, the full (100%) value of security 610 is equal to the combination of the make-whole payment and the actual liquidation proceeds. By dividing the cash flows of an existing security 610 as described, an issuer can create, issue, and manage a Guarantee Certificate 630.

It is important to note that, in this example, the buyer of Guarantee Certificate 630 pays security 610 holder for a contingent interest in the make-whole payment, not a certain interest. The make-whole payment of an insured mortgage loan, for example, is generated only if the underlying security for the loan (i.e., the real estate) is sold. Typically, real estate is liquidated only when a mortgage loan is in default. Thus, the holder of Guarantee Certificate 630 receives a make-whole payment only if the mortgage loan borrower defaults and the mortgage holder liquidates the underlying real estate. The make-whole payment also could be triggered by an event other than a real estate liquidation, such as, for example, a 30-day delinquency or foreclosure.

The purchase price sum paid to the issuer for the contingent interest of Guarantee Certificate 630 may be set at a value relative to the particular security, or it may be determined by auction. For example, a security with an extremely low likelihood of default may demand a very low amount for the corresponding Guarantee Certificate. If, however, there is a high likelihood of default, a buyer may be willing to pay a higher amount for the Guarantee Certificate. Whether or not the issuer has restricted or eliminated the buyer's ability to trade a Guarantee Certificate after issuance will also affect the initial price. After initial issuance, the price a subsequent buyer is willing to pay for a tradable Guarantee Certificate will be determined by various market factors, including the default history in the Reference Pool, and projections of the subsequent likelihood of default within the pool.

One skilled in the art will recognize that amounts of the cash flows and the types of triggering events can be varied without departing from the principles of the present invention. For example, instead of liquidation, the cash flows to the Guarantee Certificate holder could be triggered by a payment delinquency event, such as a 180-day payment delinquency, a foreclosure event, or the classification of a property as Real Estate Owned (REO). For another example, instead of the entire make-whole payment, the cash flows to the Guarantee Certificate holder could be structured to be a fraction of the make-whole payment.

Figure 7:
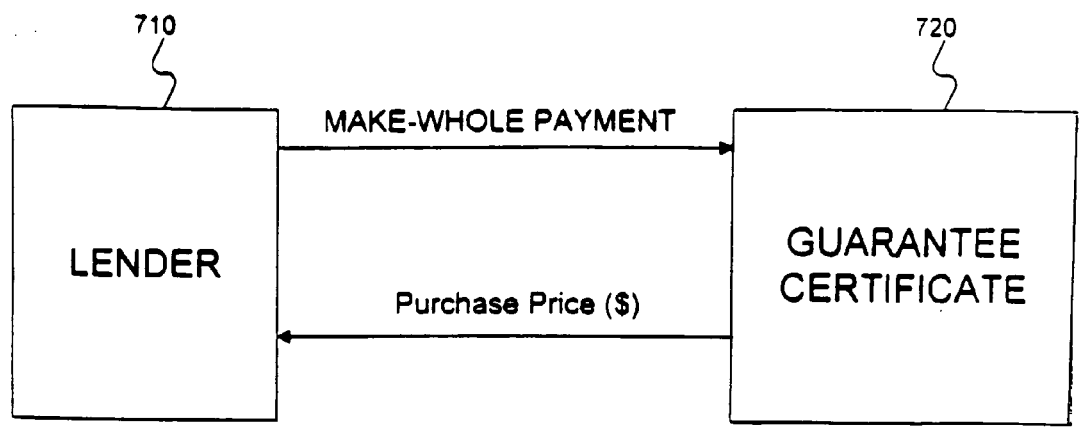
FIG. 7 is a block diagram illustrating the payment process associated with a de novo issuance of Guarantee Certificates, in accordance with the principles of the present invention.

FIG. 7 is a block diagram illustrating the payment process associated with an issuance of de novo Guarantee Certificates associated with a Reference Pool in accordance with the principles of the present invention. As shown in FIG. 7, a lender 710 issues a Guarantee Certificates 720, which is associated with a security or Reference Pool, to an entity in exchange for a sum of money. Guarantee Certificate 720 entitles the entity, or other holder in due course, to receive make-whole payments should, for example, the underlying property be sold. The make-whole payment is the difference between the full value of the security or pool and the actual liquidation proceeds. The make-whole payment also could be triggered by an event other than a real estate liquidation, such as, for example, a 30-day delinquency or foreclosure.

Reference Pools as Credit Enhancements

Like Guarantee. Certificates, Reference Pools may be used as credit enhancements that serve as hedges for sharing risk of loss on loan investments. For example, a seller may wish to sell a pool of loans (the "Subject Pool") to a buyer, but the buyer may be reluctant to purchase such loans because of a lack of information to determine a default risk factor for such loans. In order to overcome this uncertainty, the buyer and seller may enter into a risk-sharing arrangement in connection with the transaction.

In such an arrangement, the parties may agree that for a specified period of time, the performance of loans in the Subject Pool may be monitored along with comparable loans in a Reference Pool. For example, the parties may agree to a performance monitoring term of ten years. The Reference Pool may include loans having comparable attributes that match those of loans in the Subject Pool. The composition of the Reference Pool will be described below in detail.

The parties may further agree that at the end of one or more predetermined payment cycles, the performance of the two pools are compared, and based on an agreed upon payment formula, a payment due is determined for one party to make to the other to hedge risk of loss in connection with the transaction. The parties may agree to a performance measure for comparing the performance of the two pools. The performance measure may include, for example, a comparison of cumulative dollar losses in the Subject Pool and the Reference Pool, default frequencies, delinquency rates, or any other indicator of performance.

The parties may agree that the predetermined payment cycle may occur on a periodic basis, such as an annual basis, semi-annual basis, quarterly basis, monthly basis, weekly basis, etc. The payment formula may include a formula that specifies one or more rules for calculating a payment due to one party by the other party. In addition, the payment formula may include one or more payment conditions that trigger the time for one party to make payment to the other.

Adjustments may be made to the Reference Pool when a change occurs to the composition of the Reference Pool or the Subject Pool. For example, dollar losses in the Reference Pool may be adjusted for differences in the size of the pools due to, for example, prepayment of loans in either the Reference Pool or the Subject Pool. Such adjustments may be made to ensure comparability of the two pools.

Figure 8:
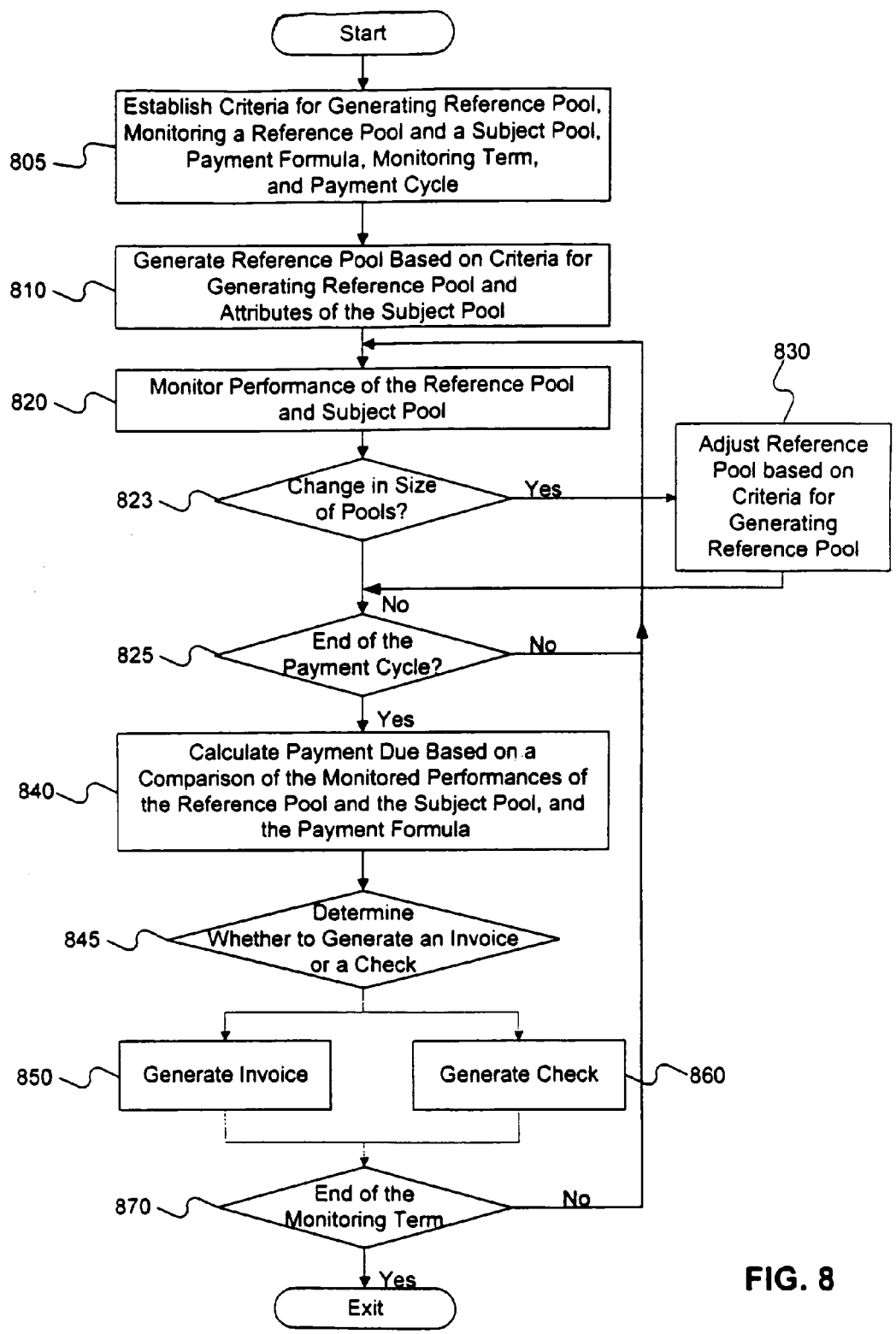
FIG. 8 is an exemplary flowchart of a method for using a Reference Pool as a credit enhancement for hedging risk of loss on loan investments, consistent with the principles of the present invention.

An embodiment of the present invention provides for using Reference Pools to hedge risk of loss in loan investments as described above. FIG. 8 is an exemplary flowchart of a method for using a Reference Pool as a credit enhancement for hedging risk of loss on loan investments, consistent with the principles of the present invention. As shown in FIG. 8, the parties may establish criteria for hedging risk of loss, such as criteria for generating a Reference Pool, a performance measure, a payment formula, a term for monitoring the performance of the loans in the Reference Pool and Subject Pool, and a payment cycle (stage 805). For example, the parties may stipulate a term of ten years for monitoring performance of the loans in the two pools. Further, the parties may agree to an annual payment cycle basis. The criteria for generating a Reference Pool may include the relative size of the Reference Pool in relation to the Subject Pool, for example, the Reference Pool may be two times the Size of the Subject Pool.

(1) Creation of a Reference Pool

A Reference Pool of loans may be created based on the criteria for generating the Reference Pool and attributes of the loans in the Subject Pool. The parties may agree on the selection of the attributes in the Subject pool (i.e., comparable attributes) that may be used to identify loans that may be included in the Reference Pool. The comparable attributes may include, for example, one or more of the following: number of loans, average dollar amount of the loans, loan origination date, geographical location of the property securing the loan, a borrower's credit rating score (e.g., a Fair Isaacs ("FICO") score), a loan to value ratio ("LTV"), a borrower's payment history, and type of loan (stage 810). The type of loan may include, for example, adjustable rate loans, adjustable rate mortgage loans (ARMs), fixed rate loans, etc.

To create the Reference Pool of loans, system 100 or a loan administrator may identify existing loans in database 210 having attributes that match the comparable attributes of the loans in the Subject Pool. The identified loans may or may not include loans that were previously owned by the seller.

System 100 or the loan administrator may populate the Reference Pool with the identified loans until the relative number of loans in the Reference Pool is reached, based on the criteria for generating the Reference Pool. For example, the criteria for generating the Reference Pool may specify that the relative number of loans in the Reference Pool may include twice the number of loans in the Subject Pool. If the Subject Pool includes 10,000 loans, the Reference Pool may include 20,000 loans and may have a number of loans ratio of 2:1 to the Subject Pool. The payment formula may include a multiplier for the number of loans ratio, which in this example is 1/2.

Alternatively, the parties may have stipulated that the total dollar amount of the UPB of the Reference Pool may be established at two times the total dollar amount of the UPB of the Subject Pool. For example, the total dollar amount of the UPB of the Subject Pool may be $100,000,000 and the total dollar amount of the UPB of the Reference Pool may be $200,000,000.

(2) Monitoring of the Reference Pool

After the Reference Pool is generated, monitoring component 220 may monitor performance of the Reference Pool and Subject Pool for the stipulated term; in this example the term is ten years (stage 820). Monitoring component 220 may store information about the monitored performance in database 210.

(3) Adjustments to the Reference Pool

Adjustments may be made to the Reference Pool when a change occurs to the composition of the Reference Pool or the Subject Pool. In this example, assume that the criteria for generating the Reference Pool specifies a relative number of loans in the Reference Pool as two times the number of loans in the Subject Pool. If a change occurs in the number of loans in the Subject Pool or the Reference Pool (stage 823), monitoring component 220 may adjust the number of loans in the Reference Pool (stage 830). For example, an adjustment may be made to the Reference Pool due to prepayment of one or more loans in the Subject Pool and/or Reference Pool. The adjustment may include deleting and/or adding one or more loans in the Reference Pool to maintain the relative number of loans in the two pools.

In an alternate example, assume that the criteria for generating the Reference Pool specifies a relative dollar amount of the UPB of the Reference Pool at two times the total dollar amount of the UPB of the Subject Pool, such that the UPB of the Reference Pool is $200,000,000 while the UPB of the Subject Pool is $100,000,000. If a change occurs in the number of loans in the Subject Pool or the Reference Pool (stage 823), monitoring component 220 may adjust the number of loans in the Reference Pool (stage 830). For example, an adjustment may be made due to prepayment of one or more loans in the Subject Pool and/or Reference Pool. The adjustment to the Reference Pool may include deleting and/or adding one or more loans in the Reference Pool to maintain the relative UPB size of the two pools.

Those of ordinary skill in the art will recognize that other adjustments may be made to the Reference Pool due to a change in composition of the Reference Pool and/or the Subject Pool.

(4) Determining a Payment Due to a Party by the Other Party

Monitoring component 220 may determine whether the end of the payment cycle is reached, such as the end of a year (stage 825). If the end of the payment cycle is not reached ("No"), monitoring of the Reference Pool and the Subject Pool continues (stage 820). Otherwise ("Yes"), payment component 240 may calculate a payment due based on a comparison of the monitored performances of the loans in the Reference Pool and Subject Pool, and the payment formula (stage 840). In this example, assume that the parties have agreed on a payment measure specifying that dollar losses in the two pools are to be compared. Further, assume that the parties have agreed to a payment formula that provides for calculating a payment due based on a dollar-for-dollar loss difference between the two pools. Also assume that at the beginning of the first year the Subject Pool has 10,000 loans and the Reference Pool has 20,000 loans. Now assume that in year one the Subject Pool has $50,000 in losses, and that the Reference Pool has $180,000 in losses. In this example, to find the relative dollar loss for the Reference Pool the $180,000 may be multiplied by ½ to get a value of $90,000. The dollar loss between the two pools may now be computed to get a value of $40,000 (i.e., 90,000–50,000); thus, the payment due is $40,000. In calculating the payment due, payment component 240 may take into account any settle-up payments made by the parties.

In another example, assume that the parties have agreed on a payment measure specifying that actual dollar losses in the two pools are to be compared. Further, assume that the parties have agreed to a payment formula that provides for calculating a payment due based on fixed percentage, in this example, 75% of the actual dollar loss difference between the two pools. Also assume that at the beginning of the first year the Subject Pool has 10,000 loans and the Reference Pool has 30,000 loans. Now assume that in year one the Subject Pool has $50,000 in losses, and the Reference Pool has $180,000 in losses. In this example, to find the relative dollar loss for the Reference Pool the $180,000 may be multiplied by ⅓ to get a value of $60,000. The actual loss difference between the two pools may now be computed to get a value of $10,000 (i.e., 60,000-50,000). The payment due to the seller is 75% times $10,000, which equals $7,500.

In yet another example, assume that the parties have agreed on a payment measure specifying that dollar losses in the two pools are to be compared. Further, assume that the parties have agreed to a payment formula that provides for calculating a payment due based on a dollar-for-dollar loss difference between the two pools. Also assume that at the beginning of the first year the Subject Pool has a UPB of $15,000,000 and the Reference Pool has a UPB of $45,000,000. Accordingly, the UPB ratio of the Reference Pool to the Subject Pool is 3:1, and the multiplier for the payment formula is ⅓.

Now assume that at the end of year one $5,000,000 UPB have been prepaid in the Subject Pool, such that the Subject Pool contains a UPB of $10,000,000. Also assume that at the end of year one $5,000,000 UPB have been prepaid in the Reference Pool, such that the Reference Pool contains a UPB of $40,000,000. The ratio of the Reference Pool to the Subject Pool at the end of year 1 is 4:1. The multiplier for the payment formula may be adjusted to take into account the change in the composition of the two pools, such that the multiplier becomes ¼ instead of ⅓. Now assume that at the end of year one the Subject Pool has $50,000 in losses, and the Reference Pool has $160,000 in losses In this example; to find the relative dollar loss for the Reference Pool the $160,000 may be multiplied by ¼ to get a value of $40,000. The dollar loss between the two pools may now be computed to get a value of $10,000 (i.e., 50,000-40,000); thus, the payment due to the buyer is $10,000.

In another example, assume that the parties have agreed on a payment measure specifying that the number of defaults in the Subject Pool and Reference Pool are to be compared. Also assume that the parties have agreed to a payment formula that provides for calculating a $100 payment for each default difference between the two pools. In addition, assume that at the beginning of the first year the Subject Pool has 10,000 loans and the Reference Pool has 30,000 loans. Now assume that in year one the Subject Pool has 500 defaults, and the Reference Pool has 900 defaults. To find the relative defaults for the Reference Pool the 900 may be multiplied by ⅓ to get a value of 300 defaults. In this example, the Subject Pool has 200 more defaults than the Reference Pool (i.e., 500–300). The payment due to the buyer may now be computed to get a value of $20,000 (i.e., $100 times 200).

(5) Determining Whether to Generate an Invoice or a Payment Form

Payment component 240 may determine to which party the payment is due, and whether to generate an invoice or a payment form, such as a check or a request for an electronic transfer of funds (stage 845). For example, if the performance of the Reference Pool is inferior to the performance of the Subject Pool, payment component 240 may generate a check on behalf of the buyer for payment to the seller in the amount of the payment due (stage 860). However, if the performance of the Subject Pool is inferior to the performance of the Reference Pool, payment component 240 may generate an invoice instructing the seller to make payment to the buyer in the amount of the payment due (stage 850).

If the payment formula includes a payment condition that triggers the time for one party to make payment to the other, payment component 240 may issue the check or invoice once the payment condition is triggered. For example, the payment formula may include a payment condition that is triggered when there is a difference of at least $25,000 in cumulative losses between the Subject Pool and the Reference Pool. If the Payment Conditions is satisfied, system 100 may issue the check or invoice as described above.

Finally, system 100 may determine whether the end of the term for monitoring the performance of the two pools is reached (stage 870). If the end of the term for monitoring is reached ("Yes"), monitoring of the Reference Pool and Subject Pool ends. Otherwise ("No"), monitoring component 220 resumes monitoring of the Reference Pool and Subject Pool (stage 820).

Risk-Based Reference Pools

Although embodiments consistent with the invention are sometimes described below in terms of a reference-pool-based, loan risk-sharing arrangement between a capital-regulated institution, such as a bank, and an entity that buys or guarantees loans, such as Freddie Mac, one of ordinary skill in the art will recognize that the invention is not limited merely to these entities, assets, requirements, and transactions, but is instead applicable to a broad range of institutions, entities, assets, requirements, and transactions. Furthermore, although the described embodiments may refer to risk in terms of the risk of loss, risk also includes the risk of a lesser gain and other types of risk as well.

One embodiment consistent with the present invention enables a bank to sell or otherwise convey loans or other assets to a guarantor, such as Freddie Mac, even though the loans have some unknown risk associated with them that makes the loans undesirable to the guarantor, such as loans that have been originated using nonstandard processing and documentation and loans to higher risk borrowers. This embodiment uses a reference pool structure with which the guarantor identifies, segregates, and assigns responsibility for a portion of risk, such as the unknown portion of risk, to the bank. One embodiment consistent with the invention applies the bank capital guidelines for externally-rated securities to a pool of non-securitized assets, such as loans, to establish the capital reserve requirements for a regulated institution, and caps the institution's risk exposure based on the rating results of the asset pool.

Capital-Reducing Risk Sharing Process

Figure 10:
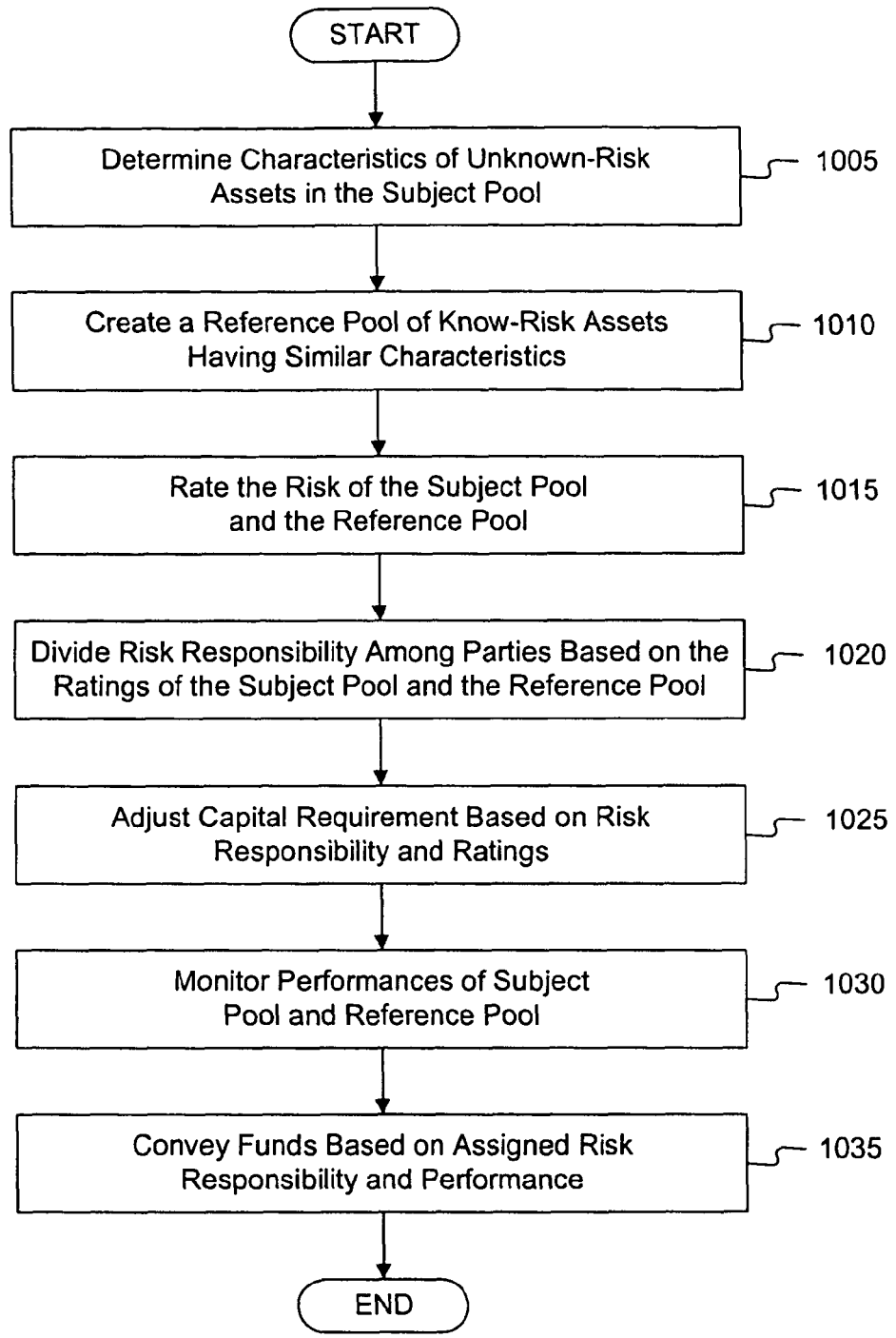
FIG. 10 is a flowchart of a minimized-capital-reserve-requirement process for sharing risk on a pool of assets consistent with the invention.

FIG. 10 is a flowchart of a minimized-capital-reserve-requirement process for sharing risk on a pool of assets that may be implemented using software programs, computers, and other data processing equipment and operations. The process illustrated in FIG. 10 begins by determining the characteristics of a group of assets having some unknown risk associated with them (step 1005). The group of assets is referred to as the subject pool. The characteristics may reflect any qualities that describe and specify the assets. For example, the characteristics of a subject pool of home mortgage loan assets may include the average, median, and/or total of the unpaid principal balance (UPB) of the loans, the average, median, and/or total loan to value (LTV) ratio of the loans, the geographic location of the properties securing the loans, the FICO scores of the borrowers, the types of properties securing the loan (e.g., single-family, multi-family, commercial), the identity of the originator, the average, median, and/or total term in years of the loans, the method or guidelines used to originate the loans, and other characteristics.

Next the process creates a reference pool of assets having similar characteristics to the assets in the subject pool (step 1010). A reference pool is typically used because the assets in the subject pool may have some unknown risk associated with them, whereas reference pool assets ideally have mostly known risks. One of ordinary skill in the art, however, will recognize that the principles of the invention can also be applied to assets that do not have an associated unknown risk. One of ordinary skill will also recognize that the invention may be applied without using a reference pool. For the loan asset example, the loans in the subject pool may have an unknown risk because they were originated using a reduced-documentation procedure that does not comply with industry standard documentation guidelines, as would be the case if the loan originator used a reduced paperwork, quick approval procedure and did not verify the borrowers' current income, employment, and/or assets. Or, the borrowers may be higher risk according to industry guidelines. The reference pool assets, on the other hand, are familiar-risk assets without unusual characteristics that might affect their expected behavior in some unknown fashion.

Figure 11:
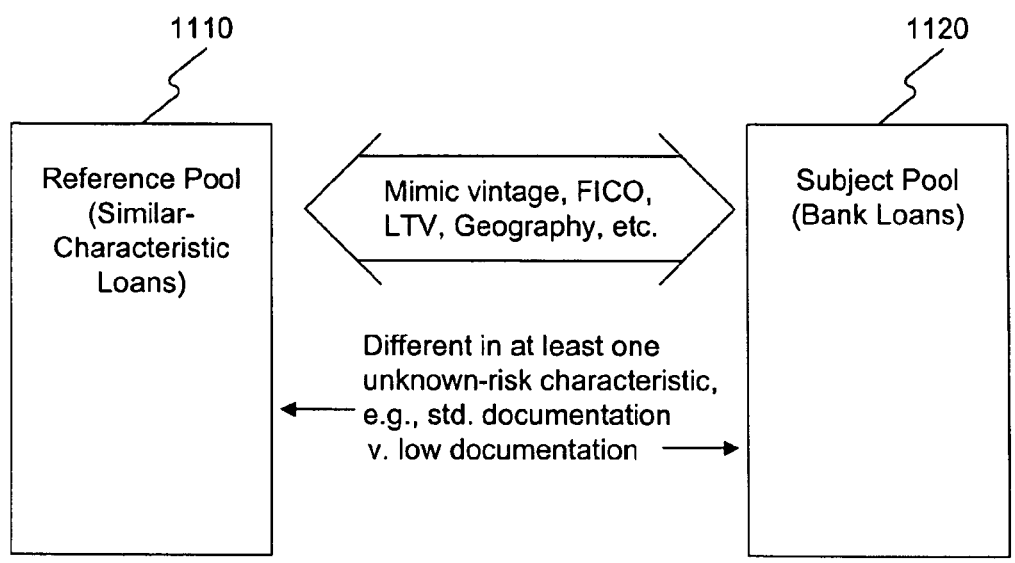
FIG. 11 is a diagram illustrating a Reference Pool and a Subject Pool consistent with the invention.

For an example, refer for a moment to FIG. 11, which is a diagram illustrating an exemplary reference pool and an exemplary subject pool consistent with the invention. Reference pool 1110 contains standard-documentation loans having characteristics or attributes such as UPB, LTV, FICO Score, geographic location, etc., similar to that of the low documentation loans in subject pool 1120. Although the reference pool loans 1110 generally mimic the characteristics of the subject pool loans 1120, they are different with respect to at least one characteristic, such as the case where they were all originated in compliance with the standard documentation guidelines, while the subject pool loans were not. Thus, because the reference and subject pools are comparable in almost all respects, with the exception of origination processing and documentation, any variation in behavior between the two pools should be due to the unknown risk associated with the reduced-documentation origination procedure used for the subject pool loans 1120. The matched sample of loans in the reference pool 1110 provides a way of holding constant sources of variation in risk between the two pools, other than the risk due to the different documentation characteristic.

The reference pool structure provides a way to separate or isolate the incremental risk (of loss or reward) due to the unknown-risk characteristic of the loans in the subject pool 1120, in this case due to the reduced-documentation origination procedure. Because the marketplace understands the risks of the familiar assets in the reference pool, one party can provide appropriate hedges or insurance and hedge prices for the assets in the subject pool to the extent they conform with the performance of the reference pool, and the other party can accept responsibility for any losses or gains beyond those of the reference pool. One of ordinary skill will recognize that the described documentation characteristic is merely exemplary, and the matched sample of loans comprising the reference pool 1110 can be chosen to isolate the performance associated with almost any characteristic of the loans in the subject pool 1120. For example, reference pool 1110 may be composed of loans where the borrowers have average FICO scores while subject pool 1120 contains only loans where the borrowers have FICO scores in the bottom quartile.

A reference pool's 1110 performance is affected by the same market risk as the subject pool 1120. Thus, the difference in performance between the reference pool and the subject pool is attributable to the difference in characteristics, such as reduced-documentation origination process. If the subject pool 1120 performs as well as or better than the reference pool 1110, then the difference in characteristics may increase asset performance or reduce asset risk. The parties may agree to share the risk indicated by performance differences in any way they choose. In one embodiment consistent with the invention, the incremental risk beyond the reference pool risk for a loan pool is capped for the originator at a specified maximum cap level, above which any further losses are absorbed by the guarantor. The cap level, as well as the guarantee fee for the cap, may be set at the start of the reference pool arrangement. In another embodiment, the cap level may be determined by a ratings agency analysis of the reference pool and/or subject pool, in a manner similar to that described below.

Returning again to FIG. 10, once the reference pool has been created, the risks associated with the subject pool and the reference pool are rated (step 1015). In one embodiment, one or more nationally recognized rating agencies, such as. Standard & Poor's and Moody's, evaluates the assets in the pools. The ratings agency assigns separate ratings for the reference pool and the subject pool. As is well known in the art, the ratings categories range from unrated (high risk) through AAA (low risk). In one embodiment consistent with the invention, the ratings agency may also provide a rating on the ratings level differences between the two pools. Based on the subordination levels (e.g., the percentage of a pool that is rated lower than a specific ratings category) determined by the ratings agency, the parties to the risk-sharing arrangement determine the risk exposure for the pools.

Next, the parties divide risk responsibilities or exposure based on the ratings of the subject pool and the reference pool (step 1020). Risk division may be accomplished by a formal contract, informal agreement, securities issuance, obligation instruments, or other means that create a risk-sharing arrangement or structure among the participating parties and specify the responsibilities and obligations of each party. A risk-sharing contract or agreement may be produced automatically by a software application program, using information about the pools, the ratings, and the parties' desired risk exposure as inputs. The risks being shared vary according to the type of asset in the pools. In the case of loan assets, the risk is primarily credit risk, which is the risk of loss due primarily to a borrower defaulting on the loan. When risk responsibilities are divided, the parties allocate the credit risk so the risk is shared between them, such that one party is assigned one portion of any credit-related losses or other losses, and another party is assigned another portion of such losses. The parties to the risk-sharing arrangement may be any number of persons or entities, for example, banks, government-sponsored enterprises (GSEs), investors, and insurance companies.

In one embodiment, a guarantor accepts responsibility for all losses in the subject pool until the level of losses actually experienced by the reference pool is met. In another embodiment, a guarantor accepts responsibility on a per-ratings-category basis for losses in the subject pool in each ratings category up to the level of losses experienced by the reference pool in the equivalent ratings category. Yet other embodiments utilize combinations of ratings category loss differences between the pools and the total cumulative loss difference between the pools to divide risk responsibility among the parties.

In accordance with capital reserve requirements, after risk division and assignment, the institution's capital reserve requirements are reduced to reflect the ratings of the assets in the pools and the risk that the entity is responsible for bearing (step 1025). This operation may be accomplished by automated accounting software applications, and typically involves the approval of appropriate regulators. Because the degree of risk associated with a pool of assets is revealed by the ratings, and because the capital-regulated institution does not bear all the risk, (but instead shares a portion of it with the guarantor according to the risk responsibility division), the capital-regulated institution's resultant capital reserve requirement is lower than it would be if the institution simply held the subject pool assets.

In another example, the subject pool of assets is rated and securitized, and then the risk-based ratio capital reserve requirements are applied. For example, seven different securities, rated AAA through unrated (UR), may be issued for a given reference pool. In yet another embodiment consistent with the invention, a phantom security that entitles the holder to one or more cash flows associated with the subject pool assets is issued and the risk-based ratio capital reserve requirements applied.

In one embodiment consistent with the invention, unsecuritized loans or other unsecuritized assets are treated the way rated securities are treated under the capital reserve requirements. For example, risk-based ratio capital reserve requirements are applied to rated loan assets in a manner acceptable to the regulatory agencies.

Data processing equipment monitors the performance (e.g., the losses or gains) of the subject pool assets and the reference pool assets (step 1030), and facilitates the conveyance of funds to the appropriate party based on the risk sharing agreement and relative performance of the pools (step 1035). These last two steps are essentially the same as described in the sections of this application regarding Guarantee Certificates and reference pools as credit enhancements.

Asset Ratings Assessment

Figure 12:
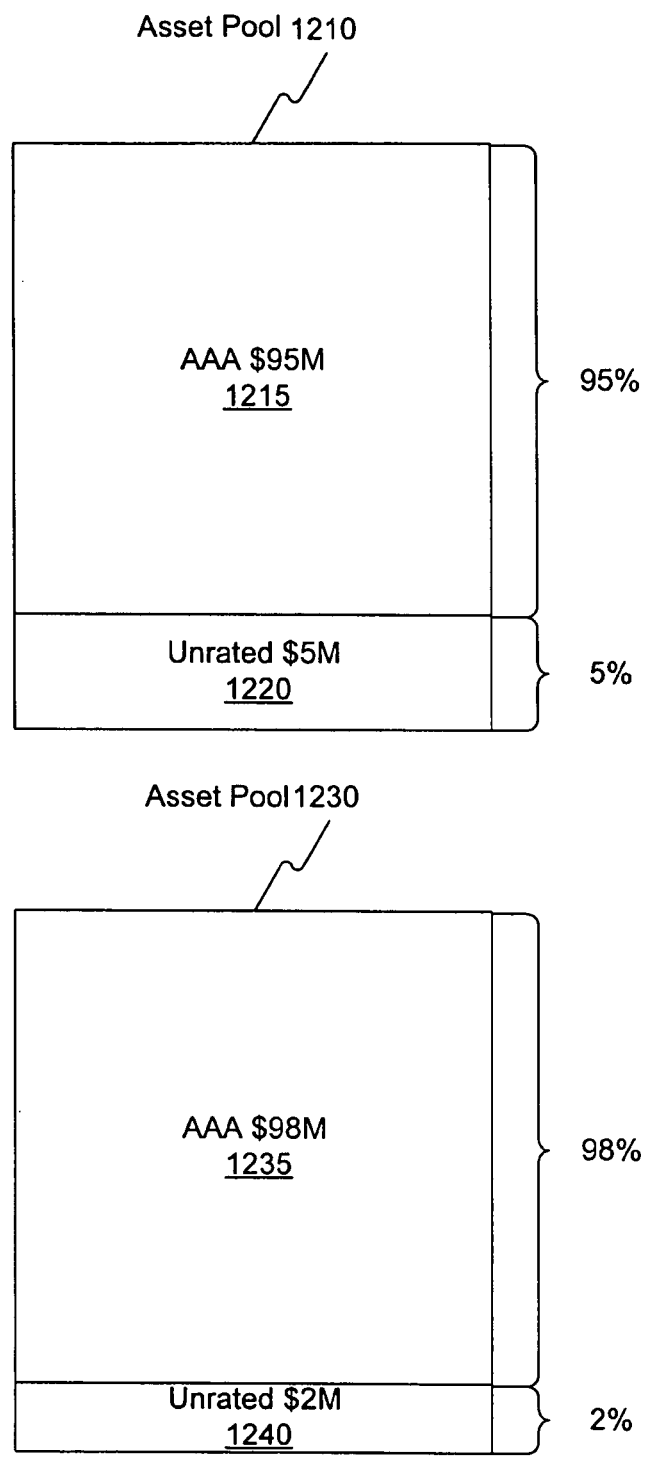
FIG. 12 illustrates a rating assessment of two asset pools.

FIG. 12 illustrates a simple rating assessment of two asset pools. As shown, a ratings agency rates asset pool 1210 containing $100 million worth of assets as being 95% AAA-rated 1215 and 5% unrated 1220. The unrated portion 1220 reflects the risky assets in the pool 1210, such as expected default costs for the case where the assets are mortgages. In one embodiment consistent with the invention, a pool of assets is submitted for rating by two or more rating agencies, such as Standard & Poor's and Moody's, and the lower rating, i.e., the one resulting in the highest subordination levels for an asset pool, is used. In another embodiment, the assets are rated by one or more of the risk-sharing parties. In yet another embodiment, a computer statistically rates the asset pools based on their characteristics. The type of assets comprising the pool are not critical to the invention. The assets may be loans, such as mortgage loans, commercial loans, or personal loans, bonds, other debt, ownership interests, stocks, or other assets.

Consider the example where the pool assets are mortgage loans and the unpaid principal balance (UPB) of the pool is $100 million. The ratings agency evaluates the loans in the pool, to determine, for example, how many are likely to default, how many are likely to prepay, etc., and concludes that 95% of the mortgages are AAA-rated 1215, and the remaining 5% deserve an "unrated" rating 1220.

The loss coverage levels of the pool are related to the ratings. Loss coverage levels are the portion of a pool of assets, typically expressed as a percentage in basis points, that must be subordinated to the senior portion(s) of the pool in order to obtain a certain rating or ratings for the senior portion(s). Thus, for asset pool 1210, the senior AAA-rated portion 1215 (i.e., the portion above the 5% subordinate unrated portion), has a loss coverage level of 500 basis points, which is $5 million for the $100 million dollar asset pool 1210. In other words, in order to receive a AAA rating on 95% of the asset pool 1210, 5% of that pool must be subordinate to the AAA portion 1215', such that the 5% unrated portion 1220 absorbs the first 5% of losses for the asset pool 1210.

Therefore, the party (or parties) responsible for the risk of the unrated portion 1220 (which may, for example, be a party in a risk-sharing arrangement for asset pool 1210 or the holder of a security representing that piece) absorbs the first $5 million of any losses for the asset pool 1210. For example, suppose that a borrower on one of the mortgages in the pool 1210 defaults on the loan, and the mortgage owner takes over the property and eventually sells it after paying expenses, such as maintaining the property while it is on the market, paying a real estate agent's commission, etc. Suppose further that when the borrower defaulted, there was $100,000 outstanding on the mortgage loan, the property sold for $80,000, and expenses totaled $10,000, leaving a loss of $30,000 on the $100,000 mortgage balance. If the total losses for asset pool 1210 up to the time of the $30,000 loss are less than $5 million, then the party or parties responsible for the risk associated with the 5% unrated portion 1220 absorb the $30,000 loss. If, on the other hand, the total losses for asset pool 1210 at the time of the $30,000 loss are $5 million or more, then the party or parties responsible for the 95% AAA rated portion 1215 absorb the $30,000 loss.

It does not matter which specific loan or individual asset among asset pool 1210 causes the loss because responsibility for the loss is divided based on the loss coverage levels. Thus, if asset pool 1210 experienced hundreds of defaults (or one large default) totaling $5.1 million, then the party responsible for the subordinate unrated portion 1220 loses $5 million and the party responsible for the AAA-rated portion 1215 loses $100,000.

In embodiments where asset pool 1210 comprises loans, mortgage assets, or mortgage-backed securities, loss does not refer to the value of the underlying assets. The party with an interest in each portion is expecting an income stream, not an increase in asset value. When defaults and other loss-triggering events occur, that income stream is reduced, and in the extreme case can vanish. Thus, the value of the pool portions has no relation to the value of the underlying properties, it is instead based on the cash flows. A mortgage-backed security's cash flow, for instance, is typically a' pass through, so whatever cash flow is coming from the mortgages (from the borrowers) passes through to the security holder. To the extent that a borrower stops making the payments and a property goes into foreclosure, that borrower's loan gets pulled out of the pool as a pay off, and any associated losses are attributed to the lowest available level of subordinate portions of the pool of mortgages containing the loan. The same principles can apply to pools of other types of assets.

If a pool of assets is securitized, the variously-rated securities can be offered on the market, and the security holders absorb losses based on the loss coverage levels for the pool associated with the securities.

The other asset pool 1230 illustrated in FIG. 12, shows exemplary ratings for another $100 million dollar pool of assets. In this example, the ratings agency determined that only 2% of the pool balance 1230 need to be subordinated with an "unrated" rating 1240 to achieve a AAA rating for the other 98% of the pool of assets 1235, which makes the AAA-rated portion's 1235 loss coverage level $2 million. In this example, the ratings agency may have determined that pool 1230 contains much better loans than pool 1210, having, for example, lower LTVs and higher FICO scores, and thus resulting in the different loss coverage level.

Figure 13:
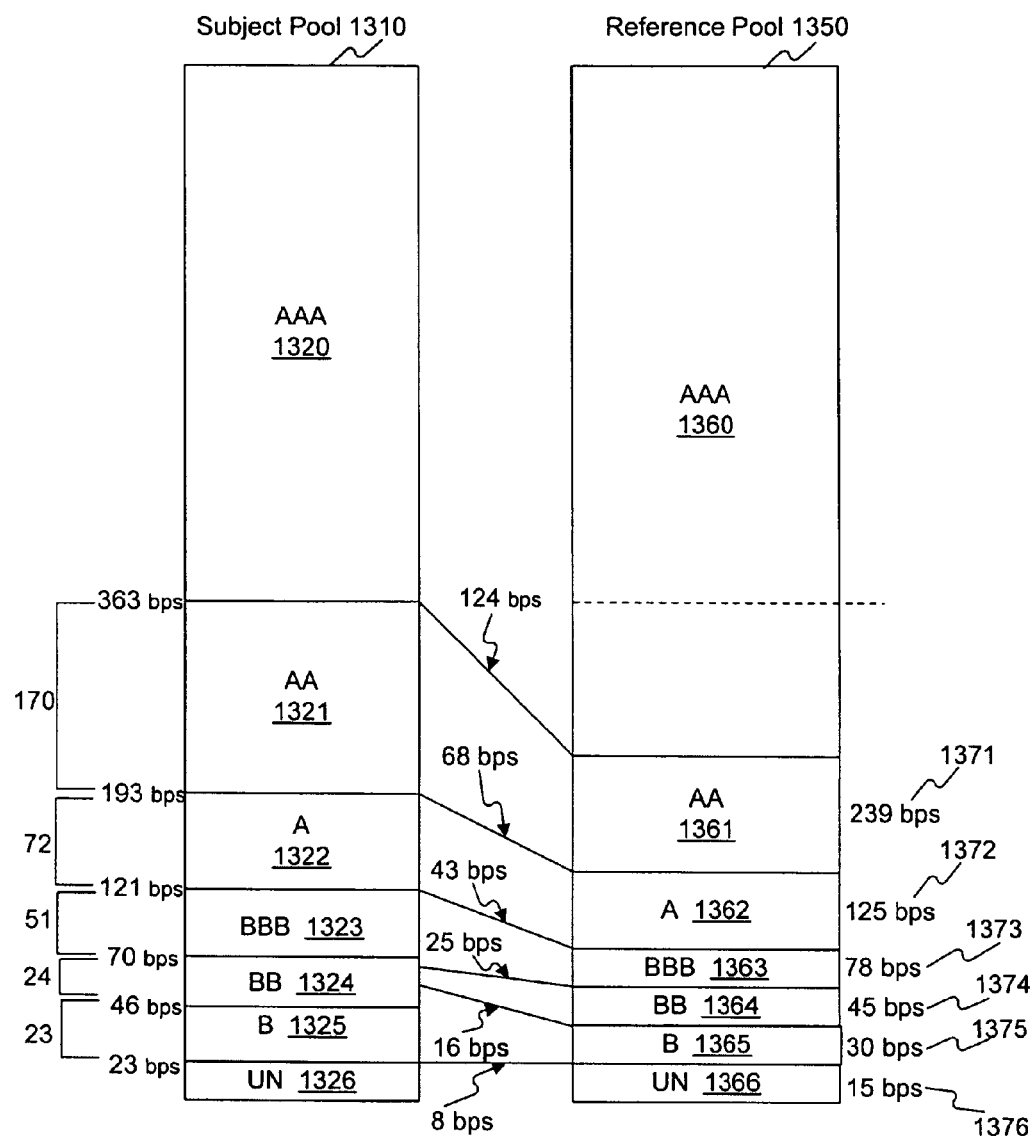
FIG. 13 illustrates another ratings assessment of two asset pools, such as might result, for example, from step 1015 of the process shown in FIG. 10.

FIG. 13 illustrates a ratings assessment of two asset pools, such as might result, for example, from rating a subject pool 1310 and a reference pool 1350 in step 1015 of FIG. 10. As shown in FIG. 13, a ratings agency rates the subject pool 1310 as containing: 23 basis points (bps) of unrated assets 1326; 23 bps of B-rated assets 1325; 24 bps of BB-rated assets 1324; 51 bps of BBB-rated assets 1323; 72 bps of A-rated assets 1322; 170 bps of AA-rated assets 1321; and 9637 bps of AAA-rated assets 1320. Similarly, the reference pool 1350 is rated as containing: 15 bps of unrated assets 1366; 15 bps of B-rated assets 1365; 15 bps of BB-rated assets 1364; 33 bps of BBB-rated assets 1363; 47 bps of A-rated assets 1362; 114 bps of AA-rated assets 1361; and 9761 bps (the remainder) of AAA-rated assets 1360. In FIG. 13, the loss coverage levels for each rating are also illustrated. For example, the unrated portion 1366 of reference pool 1350 absorbs the first 15 bps 1376 of losses for the assets in the pool. Similarly, the B-rated portion 1365 absorbs any losses greater than 15 bps 1376 up to 30 bps 1375, the BB-rated portion 1364 absorbs losses greater than 30 bps 1375 up to 45 bps 1374, the BBB-rated portion 1363 absorbs losses greater than 45 bps 1374 up to 78 bps 1373, the A-rated portion 1362 absorbs losses greater than 78 bps 1373 up to 125 bps 1372, the AA-rated portion 1361 absorbs losses greater than 125 bps 1372 up to 239 bps 1371, and the AAA-rated portion 1360 absorbs losses greater than 239 bps 1371 for the pool. Thus, for the AAA-rated portion 1360 of the reference pool 1350, the loss coverage level is 239 bps.

Any entity and method agreeable to the parties in the risk-sharing arrangement and to the capital regulators may be used to rate the asset pools as illustrated. In one embodiment, the rating is performed by a ratings agency such as Standard & Poor's or Moody's. In another embodiment, a computer software application provides ratings for the asset pools.

Capital Reserve Requirement Based On Ratings and Risk Sharing

To illustrate how the ratings could affect the capital reserve requirements of a capital-regulated institution in some simple non-mortgage asset examples, refer again to FIG. 12. Under risk-based ratio capital reserve requirements, if a capital-regulated institution held the $100 million asset pool 1210, and the pool 1210 had not been rated by a ratings agency, then the entire pool 1210 would fall into the "Other" category 980. Referring to table 900 in FIG. 9, the risk-based ratio 930 for the unrated pool 1210 is 100% and the base capital charge 940 is 8%. Therefore, the institution would have to hold reserve capital against the $100 million pool 1210 in the amount of $100 million×100%×8%=$8 million.

Now consider the case where the institution has the pool 1210 shown in FIG. 12, the pool has been rated by a ratings agency, and the ratings resulted in the two tranches or portions shown in FIG. 12 ($95M AAA-rated and $5M unrated). If regulators apply typical risk-based ratio capital reserve requirements to the pool based on its ratings tranches, the institution has to hold capital in the amount of $95 million× 20%×8%=$1.52 million for the AAA-rated tranche 1215, and $5 million×100%=$5 million for the unrated tranche 1220, for a total of $6.52 million. Thus, using risk ratings reduces the institution's capital reserve requirement for pool 1210 by about 18% in comparison to the previous example, even though the institution had to hold 100% capital in connection with the "unrated" portion of the pool under typical capital requirement regulations. And, this capital reduction results even before employing a risk-sharing arrangement to further reduce or cap the institution's risk and further reduce the capital reserve requirement. Ratings, along with a risk-sharing structure, help determine the total risk exposure of the institution for the pool of assets under the risk-based ratio capital reserve requirements.

As illustrated by FIG. 9, the risk-based capital reserve requirements recognize that certain securities are less risky than others, and that the risk is reflected in the rating of a security. Consequently, the risk-based capital reserve requirements mandate that banks and other capital-regulated institutions hold less reserve capital against low-risk-rated securities on their books than against high-risk-rated securities.

Methods and systems consistent with the present invention apply the same logic to other assets that the current risk-based capital reserve requirements do not cover, such as pools of loans, because just as with bonds and other securities, all loans are not the same. It is not equitable or necessary to require the same amount of capital to be held in reserve to back all loans. Different investments and assets have different known risks associated with them, and those risks are often ratable. For example, a pool of standard prime mortgages with 2% credit protection may be rated AAA, while a pool of subprime mortgages with 2% credit protection may be rated BB because subprime borrowers typically make a lower down payment (meaning a higher LTV ratio) and have a marginal FICO score, along with any of a host of other negative factors that make a subprime borrower a higher risk than a prime borrower. Yet, a bank may still lend money to a subprime borrowers, despite the higher probability of loss, and be faced with the problem of minimizing its capital reserve requirements for the loans. The different qualities of each borrower and each loan result in a layering of credit and collateral risk from less risky to more risky, just as with other assets.

In one embodiment consistent with the invention, an institution's capital reserve requirements are reduced further if it arranges with another party, such as a guarantor, to share the risk of loss associated with the assets in a pool. FIG. 14 is a table illustrating an exemplary risk-sharing arrangement and the resultant capital reserve requirements consistent with one embodiment of the invention. As shown, in table 1410, columns 1412 and 1435 enumerate the rating categories unrated (UR, most risky) through AAA (least risky). Column 1415 shows the loss coverage levels in basis points for a rated subject pool and column 1420 shows the size, in bps, of each category of the subject pool. Similarly, columns 1425 and 1430 show the loss coverage levels and tranche size in each ratings category for a rated reference pool to which the performance of the subject pool is compared. Column 1440 shows the delta, or difference, between the reference pool category size and the subject pool category size for each ratings category. For example, in the BB category, the subject pool has 24 bps of BB-rated assets and the reference pool has 15 bps of BB-rated assets making a difference of 9 bps for this category. Column 1445 shows the capital charge for each asset category under the risk-based ratio capital reserve requirements, and column 1450 shows the risk-based capital reserve requirement for a bank or other capital-regulated institution, which, in this exemplary risk-sharing arrangement, is based on the deltas 1440 in each category. The capital charge 1145 is an exemplary representation of the capital charges set by regulators. The capital charge 1145 may vary depending on state and federal capital reserve regulations. In one embodiment consistent with the invention, to determine the bank's risk-based capital reserve requirement, the parties apply the provisions of the bank capital standards, (such as 12 C.F.R. Chapter 1, Table B, p. 59633), for externally rated assets. In the example shown in FIG. 14, the total risk-based reserve capital required for the bank is 20.8 bps (1460). The risk-sharing arrangement shown may be generated by a software application program using as input the pool ratings, the bank capital standards, and risk limits and other parameters provided by the parties.

In an exemplary embodiment of a risk-sharing arrangement consistent with FIG. 14 and the present invention, the parties, such as a bank, and a guarantor, such as Freddie Mac, structure an arrangement such that if the subject pool does not perform as well as the reference pool, the bank's risk exposure under the structure is equal to the difference between the subject pool and reference pool sizes for each tranche. That is, the bps size difference 1440 between columns 1420 and 1430 determines the bank's exposure in each rating category. In this example, the total, worst-case, risk exposure for the bank is 124 bps (655), which is the total of all the differences in each category (column 1440).

As shown in columns 1445 and 1450, and by the absence of a delta 1454, the guarantor or some other party holds the AAA-rated portion of the subject pool in this example, so there is no reserve capital associated with the AAA-rated portion of the subject pool in the illustrated structure. If the bank held the AAA-rated portion, however, it would have to hold capital in reserve against the risk that the guarantor defaults, and the capital charge would typically be 1.6% (not shown in this example). Typically, the bank's decision to hold AAA-rated assets is more dependent on interest rate risk management and portfolio management than on credit-risk management.

In one embodiment consistent with the invention, the subject pool and reference pool are rated to determine external, market-based views of credit risk for each pools, and the ratings of the two pools are used to establish the maximum amount of performance delta 1440 that must be covered by the regulated institution. As described previously, the individual subject pool ratings also allow the regulated institution to gain risk-based capital advantages for the rated assets.

In another embodiment consistent with the invention, not only are the reference pool and the subject pool both rated, but the differences, or deltas, between the two ratings are also rated and used in structuring the risk-sharing arrangement. Rating the actual delta of the pools allows for a single risk rating that captures the view of risk inherent in both the subject pool and reference pool. This enables a regulated institution to achieve the capital advantages of a rated risk position, consistent with the principles of the invention. In terms of the overall reserve capital requirement, it may be to an institution's advantage to obtain a single risk rating or "layered" risk rating on the delta portion only.

Risk Sharing Allocation Arrangement

Figure 15:
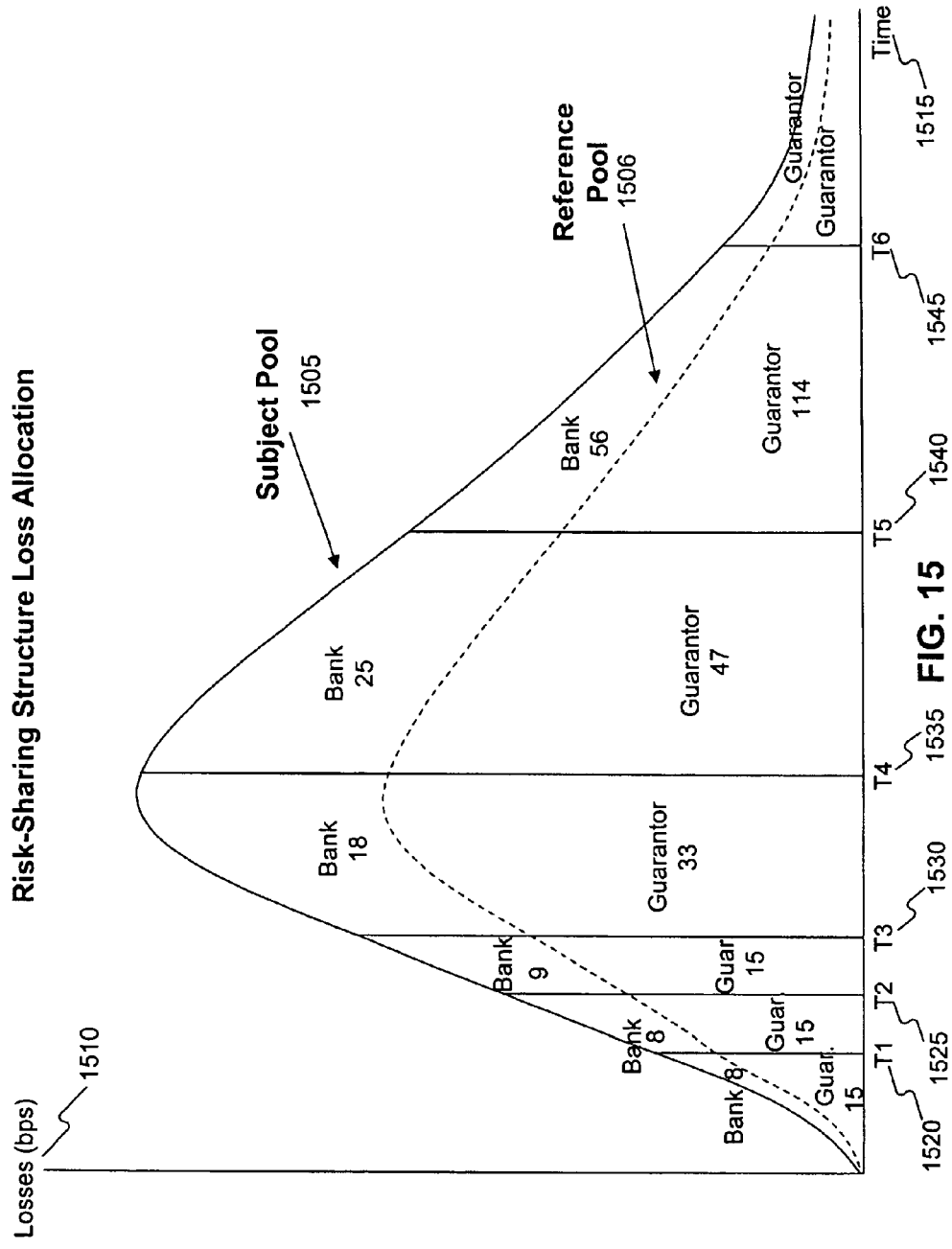
FIG. 15 is a graph depicting loss allocation for a risk-sharing structure consistent with the invention.

FIG. 15 is a graph depicting loss allocation for a loss-sharing or risk-sharing arrangement consistent with the table shown in FIG. 14. In the example shown, the subject pool did not perform as well as the reference pool. The graph depicts the loss distributions for the subject pool (shown as a solid line 1505) and the reference pool (shown as a dashed line 1506) according to the subordination levels in the table shown in FIG. 14.

In one embodiment consistent with the invention, the losses 1510 experienced by both the reference pool and the subject pool are tracked over time 1515. As losses accumulate in the subject pool 1505, they are allocated to either the bank or the guarantor based on the performance of the reference pool 1506 and according to the terms of the risk-sharing agreement between the bank and guarantor. At time T1 (720) (the time periods are arbitrary and not critical to the invention), the subject pool has experienced 23 bps of loss. According to the risk-sharing structure shown in FIG. 14, at time T1, the guarantor is responsible for 15 bps of loss, which corresponds to the losses on the reference pool 1506, and the bank is responsible for the remaining 8 bps of loss during that period of time. The 8 bps assigned to the bank corresponds to the delta for the unrated tranche category (shown in column 1440 of FIG. 14). For the illustrated risk-sharing agreement, the guarantor has guaranteed the bank that of the first 23 bps of loss experienced by the subject pool of assets, which corresponds to the loss coverage level for the "unrated" portion of the subject pool, the guarantor will absorb 15 bps, and the bank will absorb the remaining 8 bps. Thus, the bank's risk for the first 23 bps of subject pool loss is capped at 8 bps. In the embodiment shown, the terms of the risk sharing agreement are based on the ratings illustrated in FIG. 14 and on the relative performances of the subject pool and reference pool. In other embodiments, the risk-sharing parties may agree to divide the risk based on other factors or performance models.

As shown in FIG. 15, as time progresses, both the subject and reference pool losses accumulate, with the bank bearing the incremental risk on subject pool losses above those of the reference pool for each rating category. At the end of period T2 (1525), the subject pool has experienced an additional 23 bps of loss, for a total of 46 bps, while the reference pool experienced another 1.5 bps of loss. Of this additional 23 bps of subject pool loss, the guarantor is responsible for 15 bps, and the bank responsible for 8 bps. For the illustrated risk-sharing structure, the reference pool acts as a first loss position at any point in time with the guarantor taking the losses experienced by the subject pool up to the reference pool loss level for each rating category.

At the end of period T3 (1530), the subject pool has experienced another 24 bps of loss, for a total of 70 bps, while the reference pool experienced another 15 bps of loss, for a total of 45 bps. Thus, at the end of period T3 (1530) the guarantor has been responsible for a total of 45 bps of loss (15+15+15), and the bank responsible for 25 bps (8+8+9).

Similar loss distribution is plotted for time periods T4 (1535), T5 (1540), and T6 (1550). During period T4 (1535), for the next 51 basis points of subject pool loss, the guarantor takes 33, and the bank 18. For the next 72 basis points of loss in period T5 (1540), the guarantor takes 47, and the bank 25. For the next 170 basis points of loss in period T6 (1545), the guarantor takes 114, and the bank 56.

In the embodiment shown, after period T6 (1545), all further losses are taken by the guarantor, because at this point the bank has reached the maximum loss cap of 124 bps for which it is responsible under the risk-sharing structure agreed to (1455 on FIG. 14). Thus, the maximum exposure to the bank is 124 bps even under extreme scenarios. For example, if the subject pool experienced a 500 bps loss by the third year, while the reference pool experienced 100 bps of loss, the guarantor would be responsible for 376 bps under this risk-sharing arrangement; i.e., the 100 bps corresponding to the reference pool equivalent losses plus the remaining 276 bps not covered by the bank. Thus, the bank's risk is capped, which reduces its capital reserve requirement under applicable regulations. In another embodiment consistent with the invention (not shown), the parties' loss-coverage obligations are not distributed or triggered on a per-category basis. For example, in one alternative embodiment, the obligations may be triggered by the total sub-AAA loss coverage level for the entire subject pool. Thus, if the subject pool performed identically to the reference pool, then the bank would bear no loss because the difference between the AAA subordinated portions of the reference pool and the subject pool would be zero.

Another embodiment consistent with the present invention does not utilize a reference pool. In this embodiment, the subject pool is rated and a guarantor shoulders some of the risk, as described above. Instead of comparing the performance of the subject pool to a reference pool, however, the performance of the subject pool is compared to a predetermined level or levels, in each rating category or overall. For example, the parties may agree that for the unrated portion of the subject pool, the guarantor will cover the first 20 bps of loss, and the bank will be responsible for the next 7 bps of losses. The parties may further agree that for the B-rated portion of the subject pool, the guarantor will be responsible for the first 17 bps of loss, and the bank will be responsible for the next 9 bps, and so on, establishing first loss levels covered by the guarantor for each rating category, establishing incremental loss levels covered by the bank for each rating category, and capping the total loss limit for which the bank is responsible. In this embodiment, the bank may obtain more favorable first loss levels and a more favorable total liability cap by paying a higher fee to the guarantor, and may customize its capital reserve requirement by specifying the first loss levels and total liability cap for the risk-sharing structure. This embodiment, however, arguably subjects the parties to market risk that is mitigated by the previously described embodiment.

In another embodiment consistent with the invention, a reference pool is used as described above, but ratings of the reference pool and subject pool are not used to trigger loss liabilities. Instead, the bank negotiates a total liability cap with the guarantor and pays an appropriate fee for the negotiated cap. The absolute liability cap reduces the bank's risk exposure and thus its capital reserve requirement under the applicable regulations.

Figure 16:
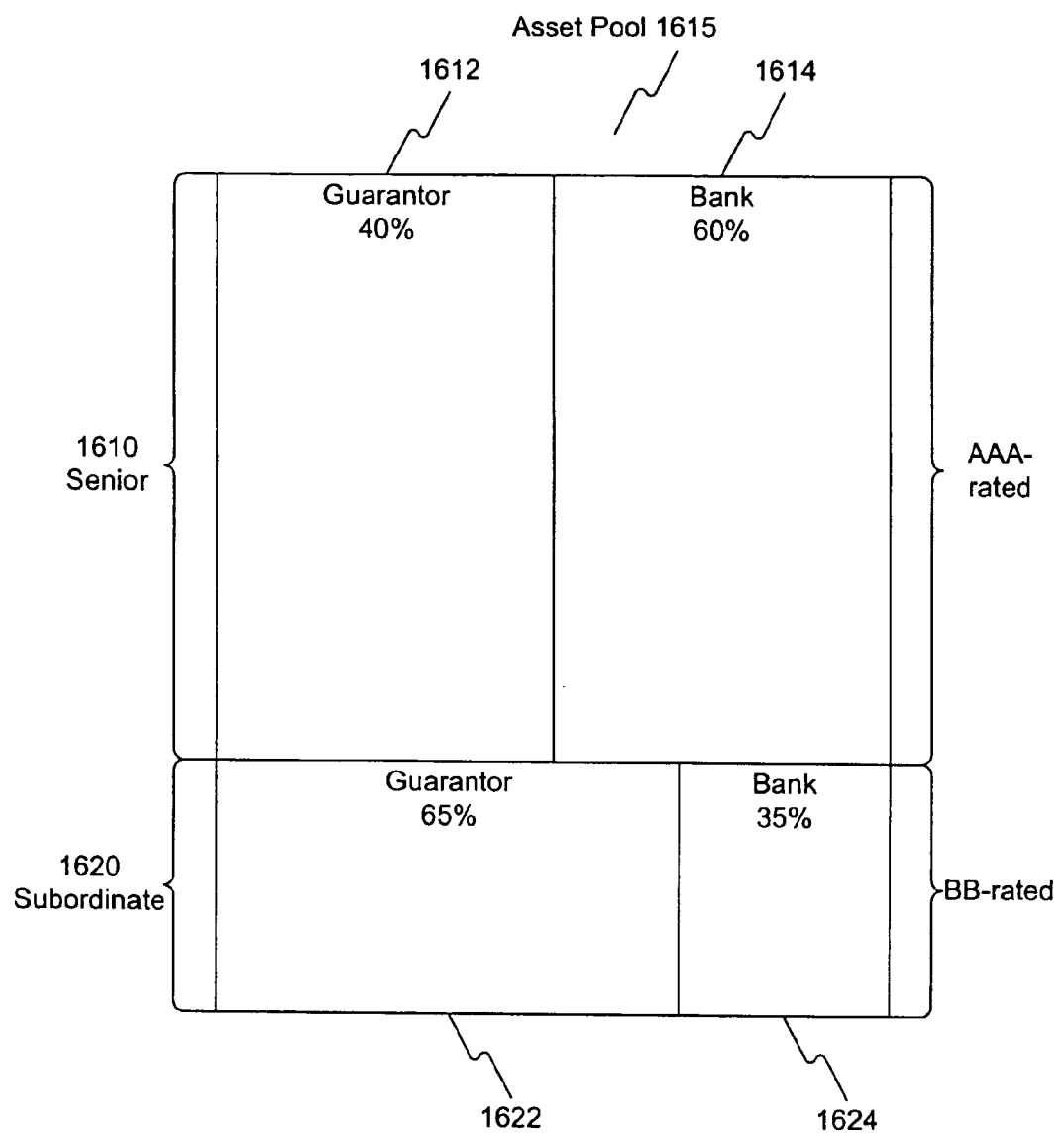
FIG. 16 illustrates an embodiment of a risk-sharing arrangement based on asset ratings that reduces capital reserve requirements consistent with the present invention.

FIG. 16 illustrates another embodiment of a risk-sharing arrangement that reduces capital reserve requirements, consistent with the present invention. As shown, asset pool 1615 has been rated as comprising a senior, AAA-rated portion 1610 and a subordinate, BB-rated portion 1620. In this embodiment, each party to the risk-sharing arrangement, such as a bank and a guarantor, is responsible for a predetermined share of the risk associated with each rated portion of the asset pool 1615. As shown, for the AAA-rated portion 1610 of the pool 1615, the guarantor is responsible for 40% of the losses experienced 1612, and the bank is responsible for 60% 1614. Similarly, for the BB-rated portion 1620 of the pool 1615, the guarantor is responsible for 65% of the losses experienced 1622, and the bank is responsible for 35% 1624. The proportion of responsibility for each rated portion 1610 and 1620 may be optimized to minimize reserve capital requirements for the bank; and a maximum liability cap for the bank may be set for each rated portion and/or for the asset pool 1615 as a whole.

Several embodiments of the present invention described above include regulatory agencies and ratings agencies treating non-security assets, such as general loan assets and mortgage loan assets, in the same manner as securities even if those assets have not been converted into securities. One of ordinary skill will recognize that the assets could be securitized before or after rating and applying risk-based ratio capital reserve requirements, without departing from the principles of the invention. Furthermore, although several embodiments described above use specific exemplary risk-based ratios and base capital charges for illustration (often based on past or current federal or state capital reserve requirements), one of ordinary skill will recognize that the principles of the invention apply as well to ratings categories, risk-based ratios, base capital charges, and capital reserve requirements other than those used in the examples, including any that may be implemented in future federal or state capital reserve requirement regulations.

CONCLUSION

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for reducing capital required to be held in connection with a subject pool of loans using at least one processor in communication with at least one nontransitory storage medium, comprising:
    obtaining from the at least one nontransitory storage medium, using the at least one processor, a credit risk rating of the loans in the subject pool;
    allocating credit risk for the subject pool, based on the credit risk rating;
    applying capital reserve requirements to the subject pool based on the credit risk rating and the allocated credit risk; and
    holding an amount of capital against the subject pool based on application of the capital reserve requirements.

2. The computer-implemented method of claim 1, further comprising:
    obtaining a plurality of credit risk ratings of the loans in the subject pool; and
    selecting a credit risk rating from the plurality of credit risk ratings that is determined to have the lowest credit risk rating.

3. The computer-implemented method of claim 1, wherein the credit risk rating is obtained from a risk-sharing party.

4. The computer-implemented method of claim 1, wherein the credit risk rating is obtained from a statistical model.

5. The computer-implemented method of claim 1, further comprising obtaining a plurality of credit risk ratings associated with a plurality of groupings of loans in the subject pool.

6. The computer-implemented method of claim 1, wherein a grouping of loans in the subject pool is unrated.

7. The computer-implemented method of claim 6, further comprising:
- applying capital reserve requirements to the unrated grouping of loans; and
- holding an amount of capital against the subject pool based on application of the capital reserve requirements to the unrated grouping of loans.

8. The computer-implemented method of claim 1, further comprising:
- obtaining a credit risk rating of loans in a reference pool;
- allocating credit risk for the reference pool, based on the credit risk rating of the loans in a reference pool;
- applying capital reserve requirements to the reference pool based on the credit risk rating of the loans in the reference pool and the allocated credit risk for the reference pool; and
- comparing the capital reserve requirements for the reference pool to the capital reserve requirements for the subject pool.

9. The computer-implemented method of claim 8, further comprising obtaining a differential credit risk rating based on the difference, if any, between the credit risk rating of the loans in the reference pool and the credit risk rating of the loans in the subject pool.

10. The computer-implemented method of claim 9, further comprising:
- applying capital reserve requirements to the subject pool based on the differential credit risk rating; and
- holding an amount of capital against the subject pool based on application of the capital reserve requirements to the subject pool based on the differential credit risk rating.

11. A computer-based system for reducing capital required to be held in connection with a subject pool of loans, comprising at least one processor and at least one storage medium storing a plurality of instructions, the plurality of instructions being executable by the at least one processor for:
- obtaining, using the computer, a credit risk rating of the loans in the subject pool;
- allocating credit risk for the subject pool, based on the credit risk rating;
- applying capital reserve requirements to the subject pool based on the credit risk rating and the allocated credit risk; and
- holding an amount of capital against the subject pool based on application of the capital reserve requirements.

12. The computer-based system of claim 11, further comprising instructions executable by the at least one processor for:
- obtaining a plurality of credit risk ratings of the loans in the subject pool; and
- selecting a credit risk rating from the plurality of credit risk ratings that is determined to have the lowest credit risk rating.

13. The computer-based system of claim 11, wherein the credit risk rating is obtained from a risk-sharing party.

14. The computer-based system of claim 11, wherein the credit risk rating is obtained from a statistical model.

15. The computer-based system of claim 11, further comprising instructions executable by the at least one processor for obtaining a plurality of credit risk ratings associated with a plurality of groupings of loans in the subject pool.

16. The computer-based system of claim 11, wherein a grouping of loans in the subject pool is unrated.

17. The computer-based system of claim 10, further comprising instructions executable by the at least one processor for:
- applying capital reserve requirements to the unrated grouping of loans; and
- holding an amount of capital against the subject pool based on application of the capital reserve requirements to the unrated grouping of loans.

18. The computer-based system of claim 11, further comprising instructions executable by the at least one processor for:
- obtaining a credit risk rating of loans in a reference pool;
- allocating credit risk for the reference pool, based on the credit risk rating of the loans in a reference pool;
- applying capital reserve requirements to the reference pool based on the credit risk rating of the loans in the reference pool and the allocated credit risk for the reference pool; and
- comparing the capital reserve requirements for the reference pool to the capital reserve requirements for the subject pool.

19. The computer-based system of claim 18, further comprising instructions executable by the at least one processor for obtaining a differential credit risk rating based on the difference, if any, between the credit risk rating of the loans in the reference pool and the credit risk rating of the loans in the subject pool.

20. The computer-based system of claim 19, further comprising instructions executable by the at least one processor for:
- applying capital reserve requirements to the subject pool based on the differential credit risk rating; and
- holding an amount of capital against the subject pool based on application of the capital reserve requirements to the subject pool based on the differential credit risk rating.

* * * * *